United States Patent [19]

Mitsuya et al.

[11] 4,319,267
[45] Mar. 9, 1982

[54] PICTURE CODING AND/OR DECODING EQUIPMENT

[75] Inventors: Eiji Mitsuya, Yokohama; Shinichi Murakami; Katsumi Mori, both of Yokosuka; Tomio Kishimoto; Takahiko Kamae, both of Yokosuka, all of Japan

[73] Assignee: Nippon Telegraph and Telephone Public Corporation, Tokyo, Japan

[21] Appl. No.: 116,713

[22] Filed: Jan. 30, 1980

[30] Foreign Application Priority Data

Feb. 16, 1979 [JP] Japan ................................. 54-17072
Feb. 16, 1979 [JP] Japan ................................. 54-17073
Feb. 16, 1979 [JP] Japan ................................. 54-17074
Feb. 16, 1979 [JP] Japan ................................. 54-17075
Feb. 16, 1979 [JP] Japan ................................. 54-17076
Feb. 16, 1979 [JP] Japan ................................. 54-17077

[51] Int. Cl.³ .......................... H04N 1/46; H04N 1/41
[52] U.S. Cl. ...................................... 358/75; 358/260
[58] Field of Search ................ 358/75, 78, 13, 12, 358/133, 135, 138, 260–262; 364/515

[56] References Cited

U.S. PATENT DOCUMENTS

3,914,788 10/1975 Niehaus ................................. 358/75
4,205,341 5/1980 Mitsuya et al. ...................... 358/260

OTHER PUBLICATIONS

Kishimoto, et al., "Block Coding of Still Pictures", The Transactions of the IECE of Japan, vol. E62, No. 1, Jan. 1979, Abstracts, pp. 37, 38.

Kishimoto, et al., "Block Coding of Still Pictures", The Transactions of the IECE of Japan, vol. J62-B, No. 1, Jan. 1979.

Primary Examiner—John C. Martin
Attorney, Agent, or Firm—Pollock, Vande Sande & Priddy

[57] ABSTRACT

A color picture is separated into three color component pictures, which are divided respectively by first, second and third block coding means into blocks and encoded. In the first block coding means, one of the color component pictures is encoded, for each block, into gray level codes representing gray level components in the block and a resolution code representing the distribution of the gray level codes in the block. In this case, when the gray level in the block undergoes a little change, an average gray level can be used as the gray level code and the resolution code can be omitted. The second and third block coding means may be identical in construction with the first block coding means. The resolution code of the block obtained by the first block coding means can also be employed in the coding of the corresponding blocks by the second and third block coding means. In the first block coding means, the size of the blocks into which the color component picture is divided is altered locally in accordance with the state of the color component picture. The block size thus changed in the first block coding means can also be used in the coding by the second and third block coding means.

28 Claims, 30 Drawing Figures

PICTURE CODING AND/OR DECODING EQUIPMENT

BACKGROUND OF THE INVENTION

This invention relates to a picture coding and/or decoding equipment which is particularly suitable for coding and/or decoding of a color still picture.

For efficient transmission and storage of pictures, compressed encoding has been proposed. As conventional methods for coding a color picture, there are known the ΔPCM coding and the DPCM coding method for transmitting a motion picture. These prior art methods are to separate a color picture signal into three color components Y, I and Q and process them individually. The ΔPCM coding method is one that is to sample a television signal by a suitable clock of, for example, about 9 to 10 MHz, compare the signal level at each sample point with the signal level at the immediately preceding sample point and encode the difference therebetween as a PCM code. The DPCM coding method is one that is to predict the signal level at each sample point using a pel (picture element) immediately preceding it and the value of a pel lying on the immediately preceding scanning line right above it and encode the difference between the predicted value and the actual signal level. Such coding methods are employed for the processing of motion pictures, and the coding of one frame must be accomplished within 33 ms which is the transmission time of one frame, and hence the processing is limited to simple one; furthermore, the amount of coded data for one frame must be retained substantially constant. Moreover, in either case, if the number of quantization levels of the differential signal is extremely reduced, then the picture quality is degraded by an overload noise, granular noise and so forth; this imposes limitations on high compressed encoding of a picture.

As a coding method for a still color picture, transfer picture coding is known, as set forth in K. PRAIT "Slant Transform Image Coding", IEEE, Trans. on. Com., Vol. COM-22, No. 8, 1974, 8, pp 1075-1093. With this method, a color picture is separated into color planes Y, I and Q; each color plane is divided into blocks, each including about 16×16 pels; the blocks are each subjected to cosine transformation or slant transformation; and according to the transformation result, the blocks are classified in dependence on their internal measure of activity. Encoding is performed changing the number of allocated bits and quantizing characteristics for each class. In this way, high compressed encoding to 1~2 bits per pel is carried out. With this conventional method, a two-dimensional picture is transformed into a frequency space and only its low-frequency component is returned to a real space, so that orthogonal transformation takes place twice. But the orthogonal transformation operation is very complicated and involves a large amount of data processed, and in addition, the decoding operation is also complicated.

It is an object of this invention to provide a picture coding and/or decoding equipment which is capable of encoding a color picture with a high compression ratio without involving complicated processing.

Another object of this invention is to provide a picture coding and/or decoding equipment which is capable of encoding a color picture with a high compression ratio through utilization of color characteristics of the picture.

SUMMARY OF THE INVENTION

According to the present invention, a color picture is separated into pictures of three color components Y, I and Q or R, G and B. The components Y, I and Q respectively indicate the Y, I and Q components in the NTSC color television signal, and the components R, G and B respectively correspond to R (Red), G (Green) and B (Blue) components of the color picture. One of the pictures of these three color components is divided by first block coding means into a plurality of blocks, each including, for example, 4×4 pels, and the blocks are each encoded. That is, each block is given a gray level code representing at least one typical gray level component, and at least one other block is given a plurality of gray level codes and a resolution code. In other words, when a change in the gray level of each pel of one block is small, for example, the mean value of the gray levels of the pels is used as the typical gray level and the block is encoded with only one gray level code. When the change in the gray level is large, a mean value $a_0$ of the gray levels of pels smaller than a means value $T_k$ of the gray levels of all pels of the block and a means value $a_I$ of the gray levels of pels larger than the mean value $T_K$ are used as typical gray level components, and these two gray level components are each used as the gray level code. The distribution of the two gray level components in the block is encoded into the resolution code. The pictures of the other two color components are also divided respectively by second and third block coding means into pluralities of blocks and are encoded for each block. In this case, each block is given a gray level code representing at least one typical gray level component. Namely, in the case where a certain degree of resolution is obtainable in the picture of one color component, the resolution codes for the pictures of the other two color components may also be omitted using only one gray level code for each block. In this case, the resolution code is given to the Y-component picture. It is also possible, of course, to encode the I- and Q-component pictures so that they are also given the resolution codes. Also, it is possible to provide the resolution code for each block of any color component pictures. In the case where there are mixed in one color component picture blocks given only one gray level code and blocks given a plurality of gray level codes and a resolution code, mode flag codes are added for distinguishing them from each other.

It is also possible to make the block size in the first block coding means smaller than those in the second and third block coding means and raise resolution of, for example, the Y-component picture alone.

The block size may also be controlled by calculating a coding error. That is, in the first block coding means, each block is encoded into a plurality of gray level codes and a resolution code, and each pel of the block is decoded using the gray level codes and the resolution, namely, the gray level codes represented by the resolution code are respectively assigned for each pel, and then an error in the above encoding of the block is calculated from each decoded pel and the corresponding original pel. If the error is larger than a preset value, then the block is changed to a smaller one, or if the error is smaller than the preset value, the block is changed to a larger one; namely, the block size is changed, and a similar operation is carried out for the new block so that the error may stay within a predetermined range. The mode flag code indicating the block size when the error is in the predetermined range, the gray level code and the resolution code are provided as final coded outputs. Also in this case, it is possible to use only one gray level code for some blocks without giving them the resolution code. Accordingly, in such a case, a code indicating the block size and the presence or absence of the resolution code is given as the mode flag code for each block. For a block of a minimum block size, when a change in the gray levels of its pels exceeds a predetermined value, the code length of the gray level code is made shorter than the code lengths of the gray level codes in the other blocks. The portion where the gray levels of their pels vary even such blocks are made small is such a portion as the contour of a picture. Such a picture can be encoded roughly since it cannot be recognized by the human eye. To change the block size during coding, as described above, is also possible by the second and third block coding means.

It is also possible to perform the block coding by the first block coding means while controlling the block size and then carry out the block coding by the second and third block coding means according to block division information which is available when the final coded output is provided by the first block coding means. This coding may be one that gives only one gray level code for each block, one that gives a plurality of gray level codes and a resolution code for each block, or a combination of the both. In other words, in the block coding by the second and third block coding means, the picture is divided into blocks in the same manner as in the block coding by the first block coding means. This permits omission of the operation for determining the block size in each of the second and third block coding means, and hence reduces the amount of coded data as a whole.

In the coding by the second and third block coding means, the gray level codes of each block may also be determined using the resolution code of the corresponding block which is obtained by the first block coding means. In this way, the operation for determining the resolution code in each of the second and third block coding means can be omitted and the overall amount of data can be decreased. Thus, the resolution code can be made common to the three block coding means, and in the case of modifying the block size, the block dividing state can be made common to the three block coding means.

In the case of using the resolution code in common to the first, second and three block coding means, a change in the gray level in each of corresponding blocks is checked, and the resolution code is obtained in respect of the block whose change in the gray level is larger than those in the other blocks, and this resolution code is used in common to the corresponding blocks in the three block coding means. Alternatively, three resolution codes of the corresponding blocks, obtained by the three block coding means, are averaged for each corresponding pel to obtain a common resolution code. By using a common resolution code, the amount of coded data can be reduced as a whole.

The typical gray level components may be not only $a_o$ and $a_l$, as mentioned previously, but also the means of their sum and difference, $$\frac{a_0 + a_1}{2} = a_m \text{ and } \frac{a_0 - a_1}{2} = a_d,$$

respectively. With such typical gray level components, in the case of the same level resolution, $a_m$ becomes a code of substantially the same code length as $a_o$ and $a_l$, since the correlation between adjoining pels is high, $a_o$ and $a_l$ assume relatively close values in many cases, and the variation range of the mean $a_d$ of the difference is smaller than the variation range of $a_o$ or $a_l$ alone; namely, $a_d$ centers around zero, and the code length of $a_d$ can be made short. Further, since the correlation between adjacent blocks is also high, the $a_m$ of each block is relatively close to that of the other block in many cases. Accordingly, a difference $d_m$ between the $a_m$ of the corresponding blocks of the same block size and the $a_m$ of the blocks respectively immediately preceding them and the $a_d$ of the difference may also be used as typical gray level components of each of the corresponding blocks. In this case, the difference $d_m$ centers around zero and its code length can be made short. This reduces redundancy in the blocks and between them, and hence decreases the overall amount of coded data.

DESCRIPTION OF THE PREFERRED EMBODIMENTS

Figure 1:
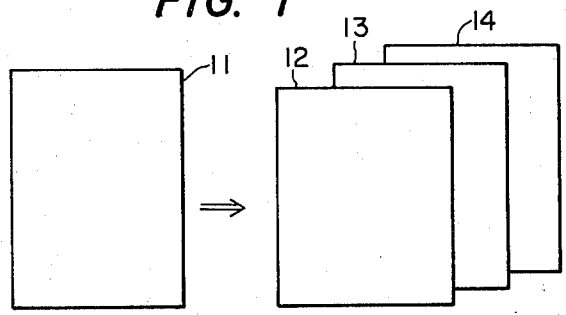
FIG. 1 is a schematic diagram showing separation of a color picture to individual color component pictures.
Figure 3:
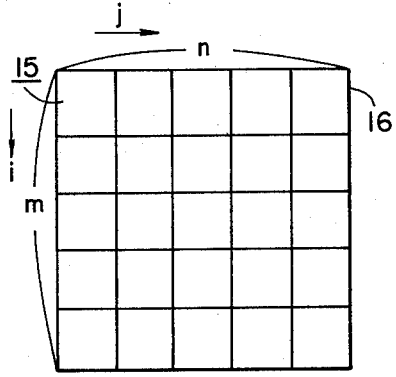
FIG. 3 is a diagram showing the relationship between each block and pels.

Referring first to FIG. 1, a color picture 11 is separated into three color component pictures 12, 13 and 14 and, for example, Y, I and Q component pictures or R, G and B component pictures in the NTSC color television signal. The color component pictures 12, 13 and 14 will hereinafter be referred to as the color planes. The color planes 12, 13 and 14 are each divided into blocks, each including a plurality of pels, and the color planes are encoded for each block. This will be described in connection with the color plane 12. The color plane 12 is divided into, for example, M×N blocks 15, each including m×n pels. The blocks 15 are each represented by $B_{kl}$, where $K=1, 2, \ldots M$ and $l=1, 2, \ldots N$. As shown in FIG. 3, each block 15 comprises m×n pels 16, and each pel is represented by Pij, where $i=1, 2, 3, \ldots m$ and $j=1, 2, 3, \ldots n$. The gray level of luminance value of the pel Pij is indicated by [Pij].

The block $B_{kl}$ is encoded into, for example, two gray level codes $a_{Ko}$ and $a_{kl}$ representing typical gray level components and a resolution code $\phi_{ij}$ representing the distributions of the gray levels $a_{ko}$ and $a_{kl}$. $a_{ko}$, $a_{kl}$ and $\phi_{ij}$ are given by the following expressions:

$$a_{k0} = \frac{1}{m_{k0}} \sum_{Pij \epsilon B_{k0}} [Pij]$$ (1)

$$a_{k1} = \frac{1}{m_{k1}} \sum_{Pij \epsilon B_{k1}} [Pij]$$

$$\phi_{ij} = \begin{cases} 0, & Pij < T_k \\ 1, & Pij \geq T_k \end{cases}$$

That is to say, the resolution code $\phi_{ij}$ assumes the value 0 or 1 in dependence on whether the gray level of the pel Pij is smaller than the threshold $T_k$ or equal to or larger than it. $B_{ko}$ is an assembly of those of the pels of the block $B_k$ whose values [Pij] are smaller than the threshold $T_k$, and $B_{kl}$ is an assembly of the pels whose values [Pij] are equal to or larger than the threshold $T_k$. The number of pels in the assembly $B_{ko}$ is represented by $m_{ko}$, and the number of pels in the assembly $B_{kl}$ is represented by $m_{kl}$. Accordingly, the gray level component $a_{ko}$ is the mean value of the gray levels of the pels whose values [Pij] are smaller than the threshold $T_k$, and the gray level component $a_{kl}$ is the mean value of the gray levels of the pels whose values [Pij] are equal to or larger than the threshold $T_k$. The threshold $T_k$ can be obtained, for instance, by averaging the gray levels of all pels of the block $B_{kl}$, or by some other methods.

By approximating the distribution of the luminance value [Pij] in the block $B_{kl}$ with the two gray level components $a_{ko}$ and $a_{kl}$ as described above, the amount of data in the block is compressed.

By this coding, the bit rate Q per pel (bits/pel) is given as follows:

$$Q = \left(1 + \frac{2 \cdot b_1}{m \times n}\right) + \left(1 + \frac{2 \cdot b_2}{m \times n}\right) + \left(1 + \frac{2 \cdot b_3}{m \times n}\right) \quad (2)$$

where $b_1$, $b_2$ and $b_3$ are the code lengths or the number of bits of the gray level codes which represent the gray level components $a_{ko}$ and $a_{kl}$ in the color planes 12, 13 and 14, respectively. Assuming that $m=n=4$ and $b_1=b_2=b_3=8$, the bit rate Q per pel is 6. In the case of simply encoding the color plates 12, 13 and 14 into 8 bits per pel, the bit rate per pel is $3 \times 8 = 24$. As will be appreciated from a comparison of the both bit rates per pel, the amount of data compressed according to the present invention is 6/24 = ¼ of the amount of data simply compressed. As the block size, $2 \times 2$, $4 \times 4$ or $8 \times 4$ is a standard; in the case of $2 \times 2$, substantially no degradation of picture quality is caused, but in the case of $8 \times 8$, degraded picture quality of details becomes very prominent.

In accordance with various embodiments of the present invention, the coding efficiency can be further enhanced, as will be described later. A first method therefor makes use of high correlation of the luminance values of pels in the block $B_{kl}$ and high correlation of the pel luminance values between adjacent blocks. Sum and difference gray level components $a_{km}$ and $a_{kd}$ of the gray level components $a_{ko}$ and $a_{kl}$ are defined as follows:

$$a_{km} = \frac{1}{2}(a_{k0} + a_{k1})$$ (3)
$$a_{kd} = \frac{1}{2}(a_{k1} - a_{k0})$$

Many of the pels in the block $B_k$ take close values in the gray level [Pij], so that the difference gray level components $a_{kd}$ are distributed in the neighborhood of zero. From the sum gray level component $a_{km}$ of the block $B_k$ and the sum gray level component $a_{k-1,m}$ of the immediately preceding block, a differential gray level component $d_{km}$ is defined as follows:

$$d_{km} = a_{km} - a_{k-1,m}$$ (4)

Since the correlation between adjacent blocks is high, the differential gray level components $d_{km}$ are also distributed centering around zero. Therefore, the coding efficiency can be increased by encoding, as the gray level components, the sum gray level component $a_{km}$ and the difference gray level component $a_{kd}$ rather than encoding directly the gray level components $a_{ko}$ and $a_{kl}$. By encoding the difference gray level component $a_{kd}$ and the differential gray level component $d_{km}$ as the gray level components, the coding efficiency can be further raised. This first method enables enhancement of the coding efficiency not only in the coding of a color picture but also in the coding of a monochromatic picture. Usually, the gray level components $a_{ko}$ and $a_{kl}$ are each encoded, for example, into an 8-bit gray level code, but by encoding the difference gray level component $a_{kd}$ into a 3- or 4-bit code and the differential gray level component into a 4- or 5-bit code, substantially the same degree of picture quality can also be obtained.

A second method is to vary the block size for each color component through utilization of the properties of individual color components of a color picture. When separated from the color picture, the Y, I and Q components respectively have frequency bands of 4, 1.5 and 0.5 MHz; namely, the spatial frequency distributions differ with individual color components. Taking advantage of such property, the color components are encoded using different block sizes. For example, the Y component color plane of high spatial frequency is divided into small blocks, whereas the I and Q component color planes are divided into larger blocks. This also enables enhancement of the coding efficiency without substantial reduction of the picture quality.

Figure 4:
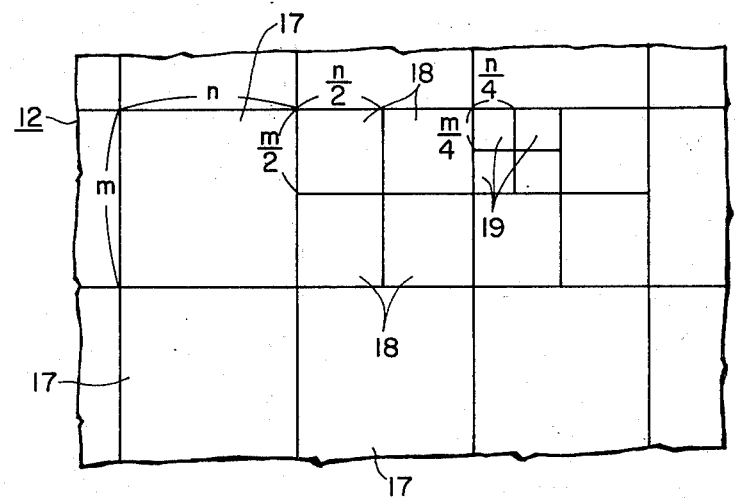
FIG. 4 is a diagram showing relationships of blocks of various sizes to one another.

A third method is to adaptively change the block size utilizing the fact that the spatial frequency distribution varies in the same color plane, that is, in accordance with the local characteristic of a picture. For example, as shown in FIG. 4, in the coding of the color plane 12, a part of a small change in the gray level is divided into mxn large blocks 17, a part of a larger change in the gray level is divided into $m/2 \times n/2$ medium-sized blocks, and a part of a further larger change in the gray level is divided into $m/4 \times n/4$ small blocks 19. The block size may also be adaptively changed for each color plane in the manner described above; alternately, it is also possible to adaptively change the block size, for example, in respect of the Y component color plane alone and divide the I and Q component color planes into such large blocks as mentioned above.

A fourth method is to enchance the coding efficiency by making use of the correlation between the color planes. The amount of coded data of the resolution component is reduced down to ⅓ by using the resolution component in common to the three color planes.

Figure 5:
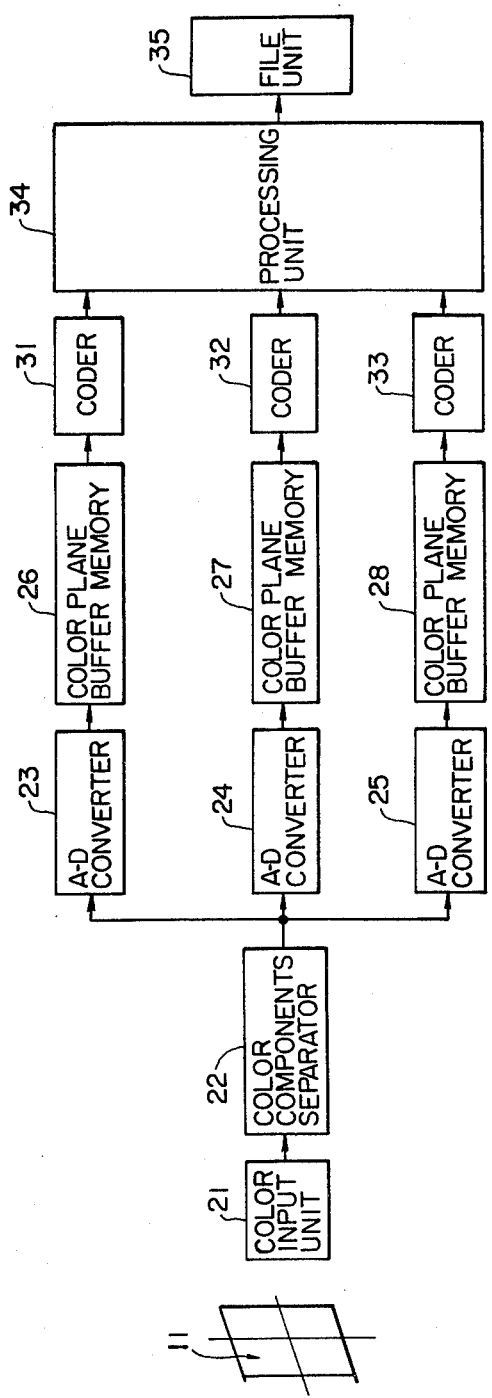
FIG. 5 is a block diagram illustrating, by way of example, a coding equipment embodying this invention.

FIG. 5 illustrates an example of a coding equipment embodying the present invention. The color picture 11 to be encoded is subjected to raster scanning by a color input unit 21 such as a color TV camera or image film reader. The output from the input unit 21 is separated by a color components separator 22 into three color components, i.e. Y, I and Q components or R, G and B components. The three color components thus separated are respectively converted by A/D converters 23, 24 and 25 into digital signals, which are stored in color plane buffer memories 26, 27 and 28, respectively. The picture information of the respective color components stored in the buffer memories 26, 27 and 28 are read therefrom and subjected to such block coding by coders 31, 32 and 33 as described above. That is to say, each color plane is divided into blocks, which are each encoded into gray level codes representing its gray level components and a resolution code representing the distribution of the gray level components. As the gray level codes, any one of pairs of the gray level components $a_{ko}$ and $a_{kl}$, the sum gray level component $a_{km}$ and the difference gray level component $a_{kd}$, and the difference gray level component $a_{kd}$ and the differential gray level component $d_{km}$ is used in coded form, as described previously. In this case, it is also possible to encode some or all blocks of one color plane using only one gray level code for each block, without using the resolution code. The coders 31, 32 and 33 may each be arranged to perform the block coding of the picture information by executing a program through the use of, for example, a micro-processor. Various coding schemes therefor will be described in detail later using flowcharts.

In the case of using one resolution code in common to corresponding blocks of the three color planes, a logical processing unit 34 is employed to determine which one of the resolution codes for the three color planes is to be used. The coded outputs thus obtained are provided to a file unit 35 wherein are stored the common resolution code and the gray level codes for each color plane. When the resolution code is not used in common, the gray level codes and the resolution codes from the coders 31, 32 and 33 are stored in the file unit 35 for each color plane. Further, mode flags respectively indicating the coding schemes used in the coders 31, 32 and 33 are also stored in the file unit 35. The coded data of each color picture thus obtained are stored, for example, in a picture center in which many pictures are stored, and from which the coded data are read or one color picture is transmitted after being encoded as described above, in reply to a request from the outside.

Figure 2:
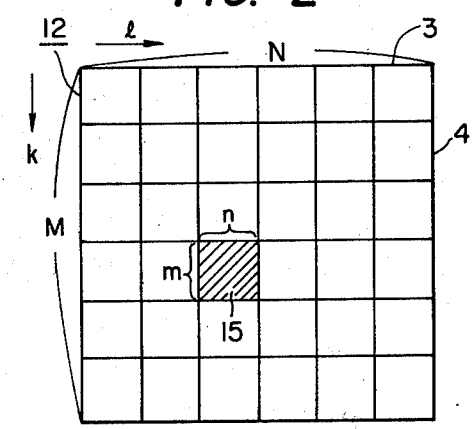
FIG. 2 is a diagram showing the relationship between each color component picture and divided blocks thereof.
Figure 6:
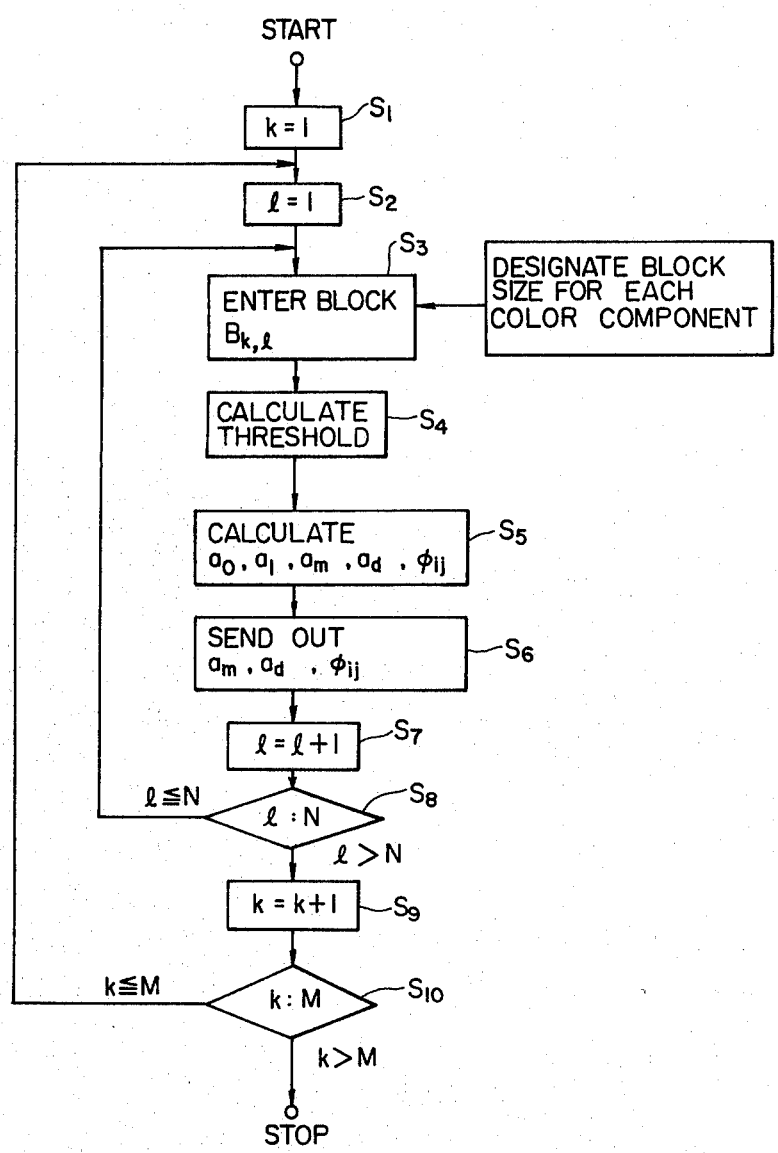
FIG. 6 is a flowchart showing fundamental processing for coding.

A description will be given, with reference to FIG. 6, of the fundamental operation for the block coding. The color plane 12 is divided, for example, into $M \times N$ blocks 15, as shown in FIG. 2, and picture information is entered for each block. This is carried out in a predetermined order, for example, from left to right or from top to bottom, starting with a predetermined position in the plane, for example, the block $B_{11}$ ($k \times 1, l = 1$) at the left upper end of the plane. At first, in step $S_1$ the content k of a row block counter is made 1, and in step $S_2$ the content l of the column block counter is made 1. In step $S_3$ the gray level (luminance signal) of each pel of the block specified by the contents of the both block counters, $K = 1$ and $l = 1$, is taken out from the corresponding buffer memory, for example, 26 in FIG. 5. At this time, the block size can be selected for each color component; for instance, the block size for the Y component color plane is small, and the block size for the I and Q component color planes are larger than that for the Y component color plane. In step $S_4$ the threshold $T_k$ for the block is calculated, and in step $S_5$, based on the threshold $T_k$, the gray level components $a_o$ and $a_l$ (the suffix k of $a_{ko}$ and $a_{kl}$ being omitted), and if necessary, the sum and difference gray level components $a_m$ and $a_d$ are calculated, and the resolution component $\phi_{ij}$ is also calculated. In step $S_6$, for example, the calculated values $a_m$, $a_d$ and $\phi_{ij}$ are sent to buffer memories or the like. In step $S_7$, 1 is added to the content l of the column block counter, and in step $S_8$ it is checked whether or not the renewed content l is equal to a maximum value N. If the content of the column block counter does not exceed the maximum value N, then the program returns to step $S_3$, in which the gray level of each picture element of the next block specified by the contents of the row and column block counters, $k = 1$ and $l = 2$, is entered, and the same processing as described above is repeated. In step $S_8$, if the content l of the column block counter exceeds the maximum value N, 1 is added to the content k of the row block counter in step $S_9$, and in step $S_{10}$ it is checked whether or not the content of the row block counter is in excess of a maximum value M. In step $S_{10}$, if the content k of the row block counter is equal to or smaller than the maximum value M, the program returns to step $S_2$, in which the content l of the column block counter is made 1. Thereafter, the same processing as described above is repeated. In step $S_{10}$, when the content k of the row block counter is larger than the maximum value M, the coding process comes to an end. In this way, one color plane is encoded for each of the M×N blocks. Likewise, the other color planes are encoded. In the case of sending $a_o$ and $a_l$ as the gray level codes, $a_m$ and $a_d$ are not calculated in step $S_5$. Through the entire specification, each of these signs $a_o$, $a_l$, $a_m$, $a_d$ and $d_m$ representing gray level components are also used to designate respective codes of the gray level components.

Figure 7:
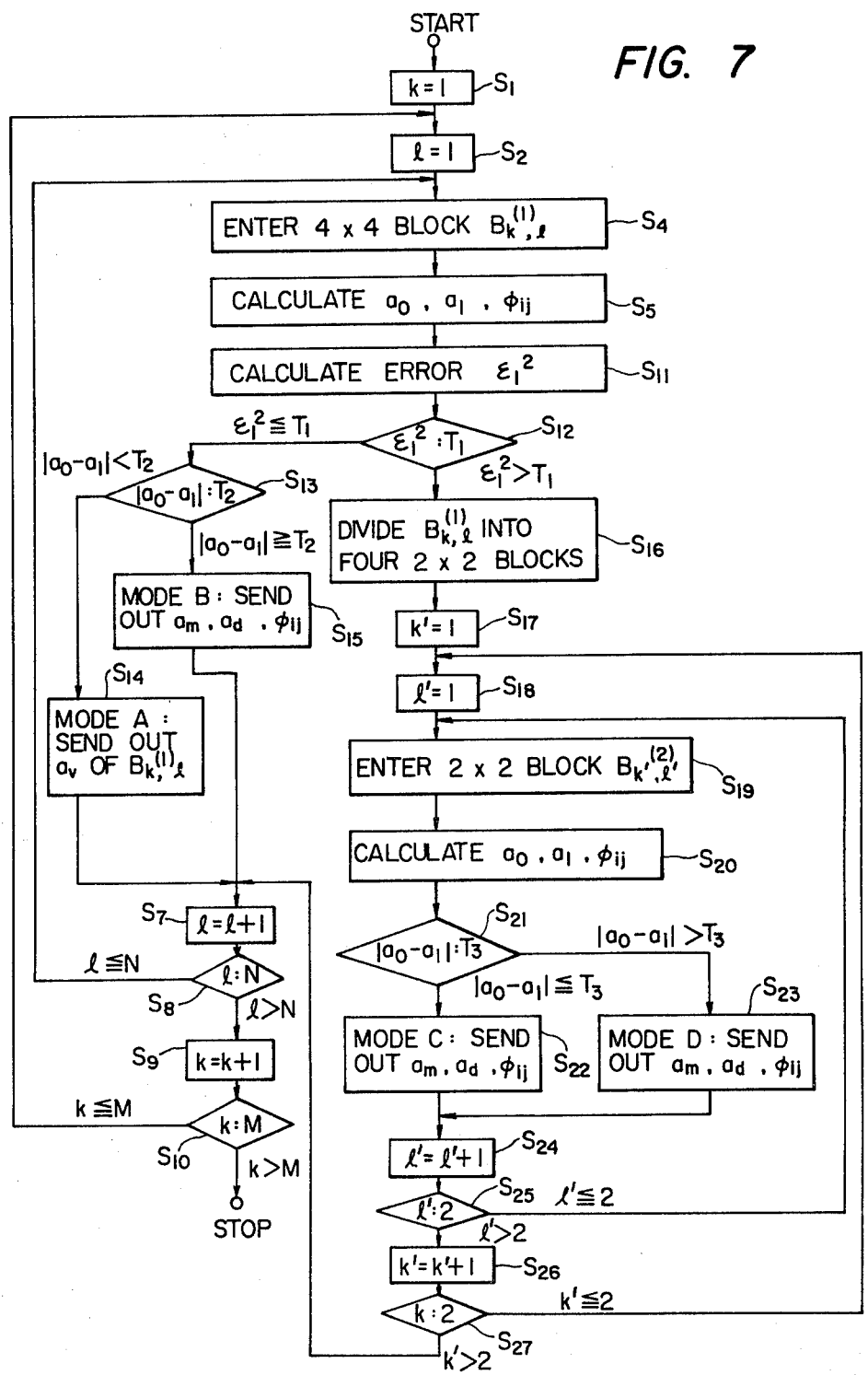
FIG. 7 is a flow chart showing an example of processing for adaptive coding.

Referring next to FIG. 7, a description will be given of such coding process in which the block size is controlled adaptively and when a change in the gray level in one block is small, no resolution code is sent out for the block and only one gray level code is sent out. In this example, coding takes place using two block sizes 4×4 and 2×2 adaptively. At first, a color plane is divided into 4×4 blocks, which are encoded one after another starting with a predetermined coding start block (k×1, l=1). As is the case of FIG 6, the contents k and l of the row and column block counters are made 1 in steps $S_1$ and $S_2$, respectively, and in step $S_4$ each pel of the block specified by the both block counters is entered. In step $S_5$ of the gray level codes $a_o$ and $a_l$ and the resolution code $\phi_{ij}$ are calculated. An error $\epsilon_1^2$ in the coding is calculated in step $S_{11}$. This error is calculated as follows: For example, the codes $a_o$, $a_l$ and $\phi_{ij}$ are decoded, that is, the gray level of each pel of the block is given the code $a_o$ or $a_l$ in dependence on whether the resolution code $\phi_{ij}$ is "0" or "1", and the square of a difference between the gray level of the pel and the original gray level [Pij] of the corresponding pel is obtained, and then such squares thus obtained for all the pels of the block are added together as the abovesaid error.

In step $S_{12}$ the error $\epsilon_1^2$ is compared with a threshold $T_1$, and if the former is equal to or smaller than the latter, than $|a_o-a_l|$ of the gray level codes $a_o$ and $a_l$ calculated previously is compared with a threshold $T_2$ in step $S_{13}$. If $|a_o-a_l| < T_2$, that is, if the gray level variation in the block is below a predetermined value, the operation is put in mode A in step $S_{14}$, in which, for the block, the resolution code $\phi_{ij}$ is omitted and an average value $a_v$ of the gray levels of all the pels in the block, sixteen pels in this example, is sent out as the gray level code to the buffer. In step $S_{13}$, if $|a_o-a_l| \geq T_2$, that is, if the gray level variation in the block is equal to or larger than the predetermined value, the operation is put in mode B in step $S_{15}$, in which, for the block, the sum gray level code $a_m$, the difference gray level code $a_d$ and the resolution code $\phi_{ij}$ are sent to the buffer.

If $\epsilon_1^2$ is larger than the threshold $T_1$ in step $S_{12}$, the block is subdivided into four smaller blocks $B_{k'l'}^{(2)}$ (k'=1, 2, l'=1, 2), and in step $S_{17}$ the content k' of a small-block row counter is made 1, and in step $S_{18}$ the content l' of a small-block column counter is made 1. In step $S_{19}$ all pels of the small block $B_{k'l'}^{(2)}$ specified by the contents k, l, k' and l' of the block counters are taken out, and in step $S_{20}$ the codes $a_o$, $a_l$ and $\phi_{ij}$ are calculated for the small block. From the gray level codes $a_o$ and $a_l$ thus calculated, it is decided whether the gray level variation in the small block is larger or smaller than a predetermined value. That is, in step $S_{21}$ it is decided whether $|a_o-a_l|$ in the small block is larger or smaller than a threshold $T_3$; if $|a_o-a_l| \leq T_3$, the operation is put in mode C in step $S_{22}$, in which the gray level codes $a_m$ and $a_d$ and the resolution code $\phi_{ij}$ of the small block are sent to the buffer. If it is decided in step $S_{21}$ that $|a_o-a_l| > T_3$, the operation is put in mode D in step $S_{23}$, in which the codes $a_m$, $a_d$ and $\phi_{ij}$ are sent, for the small block, to the buffer. In this case, however, the gray level codes $a_m$ and $a_d$ are made shorter in code length than those in modes A, B and C, for example, 4-bit. That is, it is at a contour or like part of the picture that the gray level greatly varies in such small blocks as 2×2 ones, and even if resolution of the gray level in such a part is made rough, deteriorated picture quality is not recognized by the human eye, so that the above processing is employed with the view to the reduction of the amount of coded data.

Upon completion of sending out the codes in either of steps $S_{22}$ and $S_{23}$, the content l' of the small-block column counter is added with 1 in step $S_{24}$, and in step $S_{25}$ the content l' added with 1 is compared with a maximum value 2 in the column of the small blocks. If l'≤2, the program returns to step $S_{19}$, and if l'>2, the program proceeds to step $S_{26}$, in which the content k' of the small-block counter is added with 1. In step $S_{27}$ the content k' added with 1 is compared with a maximum value 2 in the row of the small blocks; if k'≤2, the program returns to step $S_{18}$, and if K'>2, coding of all the small blocks $B_{k'l'}^{(2)}$ subdivided from the block $B_{kl}^{(1)}$ comes to an end and the program proceeds to step $S_7$. Also steps $S_{14}$ and $S_{15}$ in which the codes are sent are followed by step $S_7$. Steps $S_7$, $S_8$, $S_9$ and $S_{10}$ are identical in processing with the corresponding steps in FIG 6. In steps $S_{14}$, $S_{15}$, $S_{22}$ and $S_{23}$ the codes are sent along with mode flags used as codes representing the modes.

Figure 8:
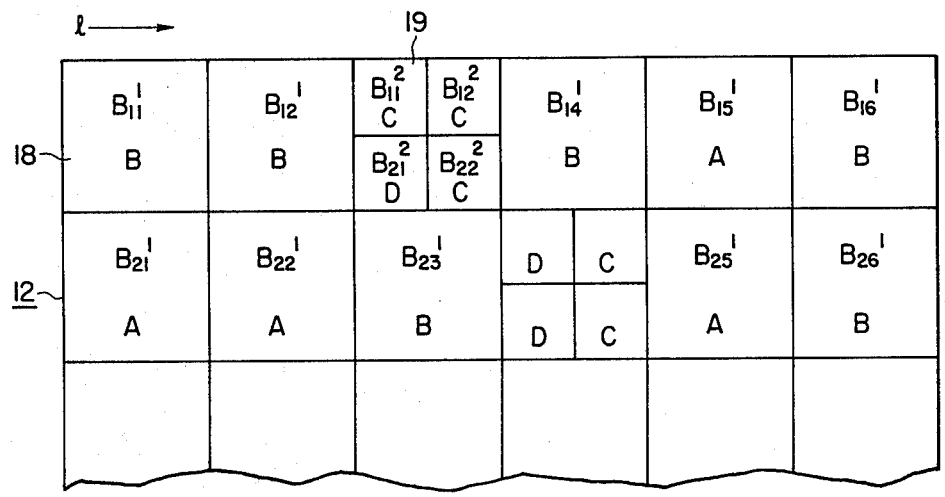
FIG. 8 is a diagram showing block and mode distributions on a color plane.
Figure 17:
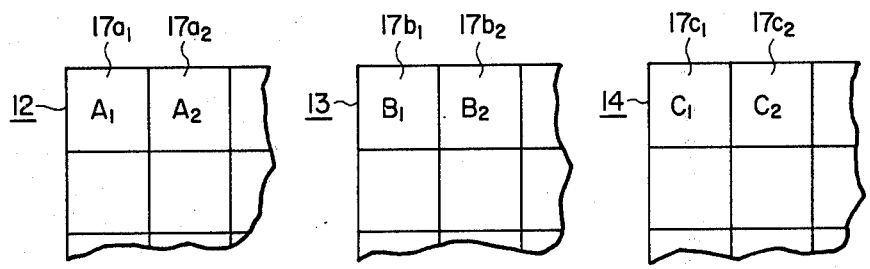
FIG. 17 shows coded data on three color planes.

As a result of such processing as described above, the color plane 12 is adaptively divided, for example, into 4×4 blocks $B_{kl}^{(1)}$ and 2×2 small blocks $B_{k'l'}^{(2)}$, as depicted in FIG. 8, and encoded for each block. In FIG. 8, the upper reference character in each block indicates its block number and the lower reference character the coding mode flag of the block. The codes thus obtained may be used directly as compressed codes for one color plane, but their amount of coded data can be further compressed. To this end, the correlation between adjacent blocks, for example, is utilized; namely, the correlation is sent in the form of the differential gray level code $d_m$ obtained between adjacent blocks, as mentioned previously. In this case, however, the 2×2 small blocks 19 are subdivided from one of the 4×4 blocks 18 because the gray level variation of the latter is large, and it is considered that such a large gray level variation means low correlation between adjacent ones of the small blocks, and consequently, in the small blocks, the correlation is sent as the sum gray level code $a_m$ instead of as the differential gray level code $d_m$. When adjacent blocks are both in mode B like the blocks $B_{11}^{(1)}$ and $B_{12}^{(1)}$ in FIG. 8, the differential gray level code $d_m = a_{m,l} - a_{m,l-1}$. When adjacent blocks are both in mode A like the blocks $B_{21}^{(1)}$ and $B_{22}^{(1)}$, $d_m = a_{v,l} - a_{v,l-1}$. When adjacent blocks are respectively in mode A and in mode B like the blocks $B_{22}^{(1)}$ and $B_{23}^{(1)}$, $d_m = a_{m,l} - a_{v,l-1}$; and when adjacent blocks are respectively in mode B and in mode A like the blocks $B_{14}^{(1)}$ and $B_{15}^{(1)}$, $d_m = a_{v,l} - a_{m,l-1}$. As an initial value in the case of employing such a differential gray level code $d_m$, use is made of the gray level code $a_m$ or $a_v$ of the block (l=1) at the left end of the color plane or the block at the right of the 2×2 block 19, that is, the block $B_{14}^{(1)}$ or $B_{25}^{(1)}$.

In the case of sending the mode flag, it may be attached to the leading end of the data of each block in combination with the gray level code and the resolution code thereof; alternatively, the mode flags of all blocks are attached together to the leading end of the data of one color plane. Since a transmission error of the mode flag causes a disturbance over the entire area of a picture, it is preferred to ensure the prevention of such a transmission error by attaching the mode flags of all the blocks to the leading end of the data of the color plane separately of the gray level codes and the resolution codes and sending the mode flags twice.

Figure 9A:
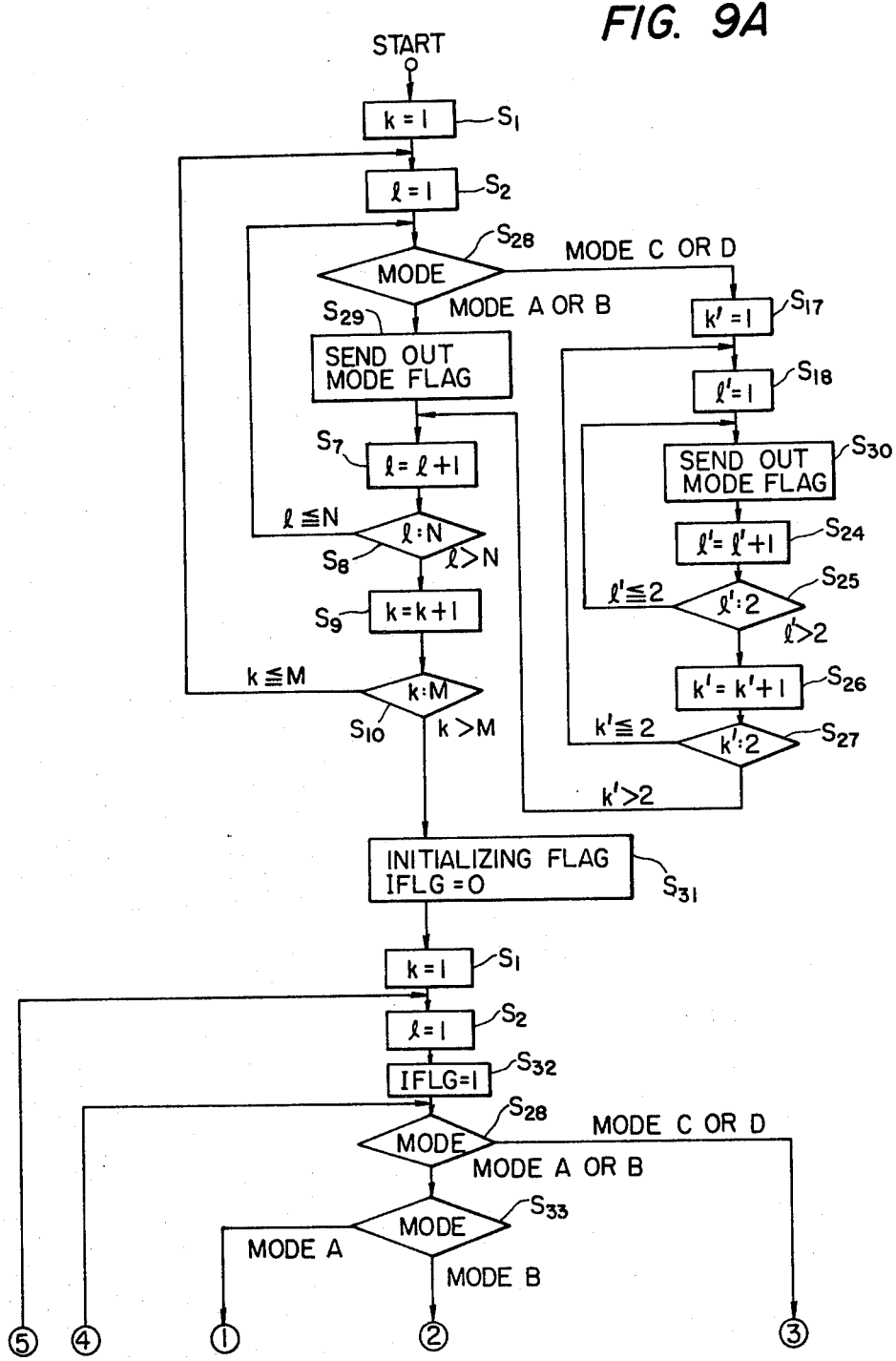
FIGS. 9A and 9B form a flowchart showing an example of code sending-out processing.
Figure 9B:
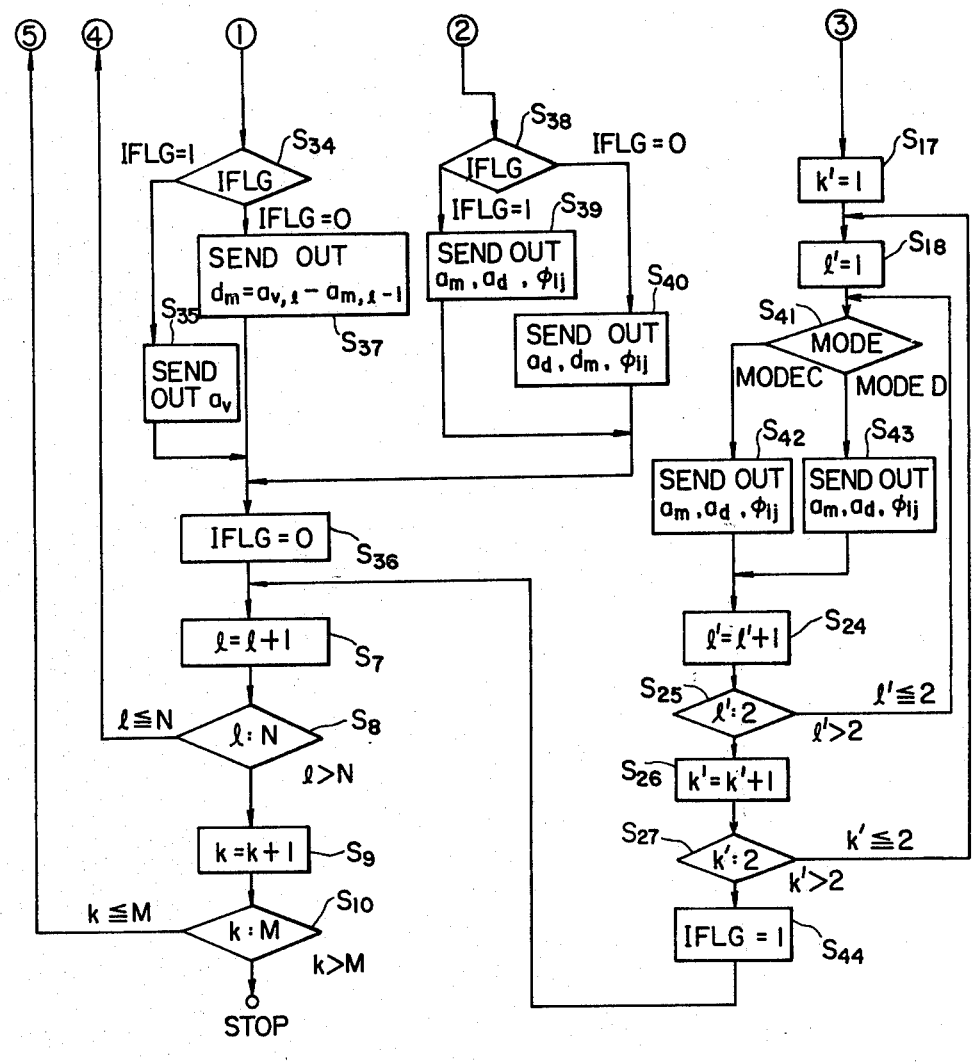

Next, a description will be given, with reference to FIG. 9A and B, of an example which encodes the color plane while obtaining the correlation between adjacent blocks. In this example, the mode flags are sent in a sequential order starting with the block (k=1, l=1) at the left upper end of the color plane towards the right lower end thereof, and also in the region of the 2×2 small blocks, the mode flags are sent in the same order as mentioned above. As the mode flags, codes 00, 01, 10 and 11 may be assigned to modes A, B, C and D, respectively, and it is also possible to assign variable length codes, for example, Huffman codes, according to the frequency of occurrence of each mode. In FIGS. 9A and B, as is the case with each of the examples described previously, the contents k an l of the block counters are made 1 respectively in steps $S_1$ and $S_2$, and in step $S_{28}$ it is decided whether the mode of the block being specified is A, B or C, that is, whether the block is a 4×4 or 2×2 one. In the case of the 4×4 block, the mode flag of the block is sent in step $S_{29}$, which is followed by sending of the mode flags of the respective blocks while updating the block designation in steps $S_7$, $S_8$, $S_9$ and $S_{10}$, as is the case with the example of FIG. 6. If the block being designated is decided to be the small one, namely, 2×2 block in step $S_{28}$, then the designation of the small block in the small-block region if effected in step $S_{17}$ and $S_{18}$, and in step $S_{30}$ the mode flag of the designated small block is sent, and then in steps $S_{25}$, and $S_{26}$ and $S_{27}$ the mode flags of the respective small blocks are sent while updating the small block designation in the small-block region. After the transmission of the mode flags of all of the small blocks in the small-block region, the program proceeds to step $S_7$. In this way, the mode flags of all the blocks of the color plane are sent.

The sending of the mode flags is followed by sending of coded data such as the gray level code and the resolution code. In this case, in order to indicate the sending of an initial value of the differential gray level code, an initializing flag IFLG is made 0 in step $S_{31}$. After this, in steps $S_1$ and $S_2$ the coding start block is designated, and then in step $S_{32}$ the initializing flag IFLG is made 1, and in step $S_{28}$ it is decided whether the block being designated is the 4×4 or the small block. In the case of the 4×4 block, it is checked in step $S_{33}$ whether the designated block is in mode A or B. When the block is decided to be in mode A, it is checked in step $S_{34}$ whether the initializing flag IFLG is 1 or 0. That the initializing flag is 1 means that the designated block is in mode A and is used as the initial one. Namely, this block corresponds to the block $B_{21}{}^{(1)}$ in FIG. 8, and the average gray level code $a_v$ is sent as the initial value and then the program proceeds to step $S_{36}$. In step $S_{36}$ the initializing flag IFLG is made 0, indicating that the initial value has already been sent. In step $S_{34}$, if the initializing flag IFLG is 0, it indicates that the initial value of the gray level code has already been sent. Accordingly, in step $S_{37}$, the differential gray level code $d_m = a_{v,l} - a_{m,l-1}$ is sent which represents the difference between the gray level code $a_{m,l-1}$ of the immediately preceding block in the coding process and the gray level code $a_v$ of the currently designated block since its mode is A, and this block corresponds, for example, to the block $B_{15}{}^{(1)}$ in FIG. 8. After sending of the abovesaid differential gray level code, the program proceeds to step $S_{36}$. If the block is decided to be in mode B in step $S_{33}$, the state of the initializing flag is checked in step $S_{38}$. If it is 1, the block is decided to be such a block $B_{11}{}^{(1)}$ in FIG. 8, and then the codes $a_m$, $a_d$ and $\phi_{ij}$ are sent in step $S_{39}$, after which the program proceeds to step $S_{36}$. If the initializing flag IFLG is decided to be 0 in step $S_{38}$, then the resolution code $\phi_{ij}$ and the gray level code $a_d$ of the designated block and the differential gray level code $d_m = a_{m,l} - a_{m,l-1}$ or $d_m = a_{m,l} - a_{v,l-1}$ obtained in relation to the immediately preceding block are sent in step $S_{40}$. This designated block corresponds to the block $B_{12}{}^{(1)}$ or $B_{16}{}^{(1)}$ in FIG. 8. After sending of the abovesaid codes, the program proceeds to step $S_{36}$. In steps $S_7$, $S_8$, $S_9$ and $S_{10}$ following step $S_{36}$, the block designation is updated and the codes are sent for the block newly designated.

In the case where the designated block is decided to be in mode C or D, the coding start block in the small-block region is designated by steps $S_{17}$ and $S_{18}$, and in step $S_{41}$ it is checked whether the small block thus designated is in the mode C or D. When decided to be in mode C, the block is, for example, the small block $B_{11}{}^{(2)}$ in FIG. 8 and the codes $a_m$, $a_d$ and $\phi_{ij}$ are sent in step $S_{42}$. If the block is decided to be in mode D in step $S_{41}$, it corresponds to the small block $B_{12}{}^{(2)}$ in FIG. 8 and the codes $a_m$, $a_d$ and $\phi_{ij}$ are sent in step $S_{43}$. In this case, the codes $a_m$ and $a_d$ are shorter in code length than those in the codes of the other modes, as described previously. Steps $S_{42}$ and $S_{43}$ are followed by steps $S_{24}$, $S_{25}$ and $S_{26}$, in which the block designation in the small-block region is updated and the codes are sent for each small block. After sending the codes of all the blocks in the small-block region, the initializing flag IFLG is made 1 in step $S_{44}$ and the program proceeds to step $S_7$. Consequently, in the next code sending, the gray level code is sent as an initial value.

The above methods are intended to enhance the coding efficiency in the processing of each color plane, so that these methods may be used for each color plane or for one or two of the color planes; furthermore, they are also applicable to coding of a monochromatic picture.

Figure 10A:
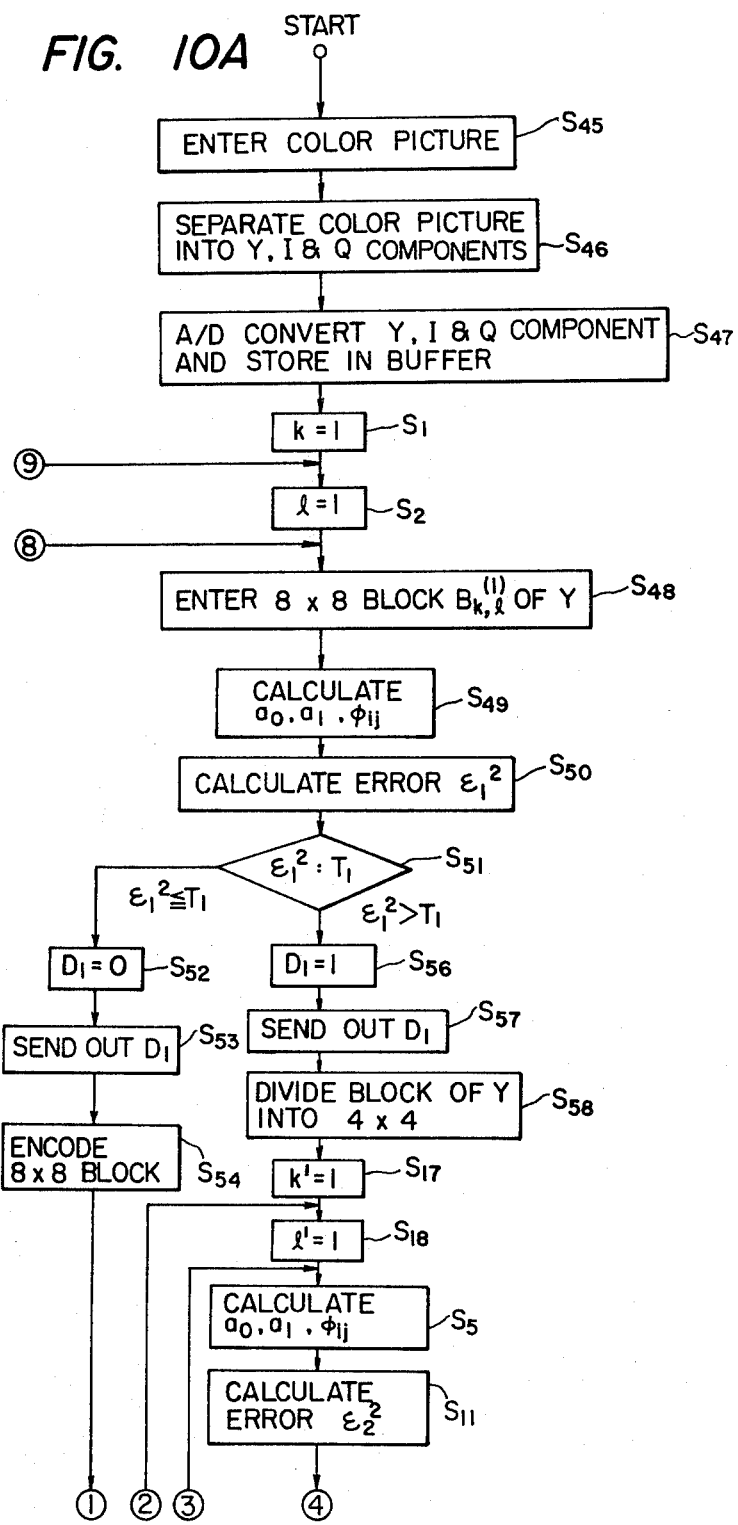
FIGS. 10A, 10B and 10C form a flowchart showing an example of coding using common block switching information.

Next, a description will be made, with reference to FIGS. 10A, B and C, of a method for obtaining enhanced coding efficiency through utilization of the correlation between the color planes. These Figures show a flowchart in which control information for changing the block size in the block coding of the three color planes is used in common to them. In this case, the color planes are described to be divided into 8×8 large blocks, 4×4 medium-sized block and 2×2 small blocks. As switching information from the large block to the medium-sized block, $D_1$ is used; namely, if $D_1 = 0$, the large block is not divided, and if $D_1 = 1$, it is divided into the medium sized ones. As switching information from the medium-sized block to the small block, $D_2$ is used. In the case of separating a color picture into Y, I and Q color components, the switching information $D_1$ and $D_2$ are determined using the color plane of the Y component which undergoes more spatial change in the picture than the other color components, and the block size of the color plane of each of the I and Q components is switched using the switching information.

At first, in step $S_{45}$ a color picture is entered, and in step $S_{46}$ the color picture is separated into Y, I and Q color components, each of which is stored as digital signals in a buffer in step $S_{47}$. Next, in steps $S_1$ and $S_2$ a coding start block is determined, and in step $S_{48}$ each pel information [Pij] of a designated large block of the Y color plane is entered. In step $S_{49}$ the codes $a_o$, $a_l$ and $\phi_{ij}$ of the large block are calculated using the entered pel information [Pij]. In step $S_{50}$, based on the calculation result, an error $\epsilon_1^2$ accompanying the coding is calculated. This calculation can be achieved, for example, by the same method as described previously in connection with step $S_{11}$ in FIG. 7. In step $S_{51}$ the error $\epsilon_1^2$ and a threshold $T_1$ are compared, and if the former is equal to or smaller than the latter, the switching information $D_1$ is made 0 in step $S_{52}$ and it is sent in step $S_{53}$. In step $S_{54}$ the large block being designated is encoded, and the program proceeds to step $S_{55}$. In the encoding in step $S_{54}$, the codes $a_0$, $a_1$ and $\phi_{ij}$ obtained in step $S_{49}$ may be held as they are, or the codes $a_m$, $a_d$ and $\phi_{ij}$ may also be calculated from them. In this case, the differential gray level code $d_m$ may also be made, as referred to previously with respect to FIGS. 9A and B, or only the average gray level code $a_v$ may be sent.

When the error $\epsilon_1^2$ is larger than the threshold $T_1$ in step $S_{51}$, the switching information $D_1$ is made 1 in step $S_{56}$ and it is sent in step $S_{57}$. In step $S_{58}$ the large block designated by the contents k and l of large block counters is divided into the medium-sized blocks. In steps $S_{17}$ and $S_{18}$ a coding start block in the medium-sized block region is designated, and in connection with the designated medium-sized block, the codes $a_o$, $a_l$ and $\phi_{ij}$ are calculated in step $S_5$. An error $\epsilon_2^2$ accompanying the coding of the medium-sized block is calculated using the abovesaid codes $a_o$, $a_l$ and $\phi_{ij}$ in step $S_{11}$. In step $S_{12}$ the error $\epsilon_2^2$ and a threshold $T_2$ are compared, and if it is desired that $\epsilon_2^2 \leq T_2$, the switching information $D_2$ is made 0 in step $S_{59}$ and is sent in step $S_{60}$, and in step $S_{61}$ the medium-sized block being designated is coded. This coding can also employ various gray level codes as is the case with the coding in step $S_{54}$. Next, the block designation in the medium-sized block region is updated by steps $S_{24}$, $S_{25}$, $S_{26}$ and $S_{27}$. In a similar manner, the switching information for each of the medium-sized blocks subdivided from the large block in step $S_{58}$ is sent and the medium-sized blocks are coded one after another. After coding of all the medium-sized blocks, the program proceeds to step $S_{55}$.

When the error $\epsilon_2^2$ is decided to be larger than the threshold $T_2$ in step $S_{12}$, the switching information $D_2$ is made 1 in step $S_{62}$ and it is sent in step $S_{63}$, and as a result of this, the medium-sized block being designated at this time is subdivided into $2 \times 2$ smaller blocks in step $S_{16}$. In steps $S_{64}$ and $S_{65}$ a coding start block in the medium-sized block is set up and the designated small block is coded in step $S_{66}$. Thereafter, the small blocks in the small-block region are sequentially updated and coded. After coding of all the small blocks, the program proceeds to step $S_{24}$.

By the above processing, pel information of one $8 \times 8$ block of the Y color plane is entered and encoded, or the block is divided into $4 \times 4$ blocks and they are encoded, or the block is further subdivided into $2 \times 2$ blocks and they are encoded. Next, in step $S_{55}$ pel information of the $8 \times 8$ blocks of the I and Q color planes is entered which correspond to the $8 \times 8$ block of the Y color plane, and in step $S_{71}$ the block switching information $D_1$ at that time is checked. If the information $D_1$ is zero, the $8 \times 8$ blocks of the I and Q color planes thus entered are coded in step $S_{72}$. In this coding, the gray level codes $a_o$ and $a_l$ or $a_m$ and $a_d$ and the resolution coded $\phi_{ij}$ or the gray level code $a_v$ are produced. In a similar manner, the block designation is updated in steps $S_7$, $S_8$, $S_9$ and $S_{10}$, and as described above, the content of the designated $8 \times 8$ block of the Y color plane is entered first and the block switching information $D_1$ and $D_2$ are determined and encoded, and further, the contents of the corresponding blocks of the I and Q color planes are entered and encoded. When the block switching information $D_1$ is 1 in step $S_{71}$, the $8 \times 8$ block being entered is divided into $4 \times 4$ blocks in step $S_{73}$, and in steps $S_{17}$, and $S_{18}$, the block designation in the $4 \times 4$ block region is performed, and in step $S_{74}$ it is checked whether the switching information $D_2$ of the Y color plane for the designated $4 \times 4$ block is 0 or 1. If the switching information $D_2$ is 0, the $4 \times 4$ blocks of the I and Q color planes being designated are coded. Then, in steps $S_{24}$, to $S_{27}$, the $4 \times 4$ blocks are successively designated, and for each block the I and Q color planes are coded. In the case where the switching information $D_2$ is decided to be 1 in step $S_{74}$, the designated $4 \times 4$ blocks of the I and Q color planes are divided into $2 \times 2$ blocks in step $S_{76}$. The $2 \times 2$ blocks are designated in steps $S_{64'}$ and $S_{65'}$, and in step $S_{77}$ the designated ones of the $2 \times 2$ blocks of the I and Q color planes are coded. In steps $S_{67'}$ to $S_{70'}$, the block designation is updated and the designated blocks are each coded in step $S_{77}$. When the end of the coding in the $2 \times 2$ block region is detected in step $S_{70'}$, the program proceeds to step $S_{24'}$, and when the end of the coding in the $4 \times 4$ block region is detected in step $S_{27'}$, the program proceeds to step $S_7$.

In the above, the codes $d_m$ and $a_d$ may also be sent as the gray level codes in each coding. As described above, pel information is entered using the $8 \times 8$ block of the Y color plane as one unit and the block is coded, and in this coding the block switching information $D_1$ and $D_2$ are obtained, and the corresponding $8 \times 8$ blocks of the I and Q color planes are coded using the switching information $D_1$ and $D_2$. Also it is possible to perform block coding of the Y color plane in its entirety and successively encode the I and Q color planes using the block switching information $D_1$ and $D_2$ obtained in the coding of the Y color plane. Further, it is also possible to perform block coding of one of the R, G and B color planes and obtain the block switching information in this coding and then effect block coding of the other two color planes using the block switching information. By employing the block switching information $D_1$ and $D_2$ in common to the three color planes as described above, the processing time for coding the color planes can be reduced. Moreover, if those of the blocks which are common in position and in size are encoded in the same mode, the amount of coded data of the mode flag can also be reduced.

Since errors in block size switching information codes and mode flag codes will cause serious degradation in the reconstructed picture, it is desirable to transmit a group of block size switching information codes and mode flag codes for each picture frame separately from the gray level codes and resolution codes, thereby increasing reliability.

Next, a description will be given, with reference to FIGS. 11A and B, of the case in which the resolution code is used in common to the three color planes. As is the case with FIGS. 10A, B and C, in steps $S_{45'}$ and $S_{47}$ a color picture is entered and separated into the three color planes and then the color planes are each stored as digital signals in a buffer. In step $S_{78}$ the Y, I and Q color planes are each divided into 4×4 blocks. In steps $S_1$ and $S_2$ a coding start blocks are designated, and in step $S_5$ the codes $a_o$, $a_l$ and $\phi_{ij}$ for the designated block of the Y color plane are obtained. In step $S_{11}$ the error $\epsilon_1^2$ in the coding is calculated. In step $S_{12}$ the error $\epsilon_1^2$ is compared with the threshold $T_1$; if $\epsilon_1^2 \leq T_1$, then the program proceeds to step $S_{79}$ in which the codes $a_o$ and $a_l$ of the I and Q color planes are obtained using the resolution codes $\phi_{ij}$ obtained in step $S_5$. This processing differs in procedure from ordinary block coding process, but in this case, the average value of the luminance of pels at which $\phi_{ij}=1$ is given is calculated as $a_1$, and the average value of the luminance of pels at which $\phi_{ij}=0$ is calculated as $a_0$. In step $S_{80}$ the coding mode, i.e. the mode A or B described previously with respect to FIG. 7, is determined using the codes $a_o$ and $a_l$ obtained for each color plane. This mode determination takes place in the same manner as in step $S_{13}$ of FIG. 7. Further, in step $S_{81}$ the gray level codes $a_m$ and $a_d$ or $a_v$ are obtained for each color plane, and in step $S_{82}$ the mode of each color plane, the code $\phi_{ij}$ of the Y color plane and the codes $a_m$ and $a_d$ or $a_v$ of each color plane are sent out. If the error $\epsilon_1^2$ is decided larger than the threshold $T_1$ in step $S_{12}$, then the program proceeds to step $S_{83}$ in which the 4×4 block of each color plane entered at that time is divided into 2×2 blocks. A coding start block in the 2×2 block region is designated in steps $S_{17}$ and $S_{18}$, and in step $S_{20}$ the codes $a_o$, $a_l$ and $\phi_{ij}$ of the block of the Y color plane are obtained, and then in step $S_{84}$ the codes $a_o$ and $a_l$ of the corresponding 2×2 blocks of the I and Q color planes are obtained using the resolution code $\phi_{ij}$ obtained in the step $S_{20}$. The calculation of the codes $a_o$ and $a_l$ are accomplished in the same manner as the processing of step $S_{79}$. In step $S_{85}$ the mode C or D described previously with regard to FIG. 7 is determined using the codes of each color plane, and in step $S_{86}$ the mode of each color plane, the resolution code $\phi_{ij}$ of the Y color plane and the gray level codes $a_m$ and $a_d$ of each color plane, thus obtained, are sent out. In steps $S_{24}$, $S_{25}$, $S_{26}$ and $S_{27}$ the block designation in the 2×2 block region is updated and similar processing is repeated for each designated block. When the end of the coding of the 2×2 block region is detected in step $S_{27}$, the program proceeds to step $S_7$, and in steps $S_7$, $S_8$, $S_9$ and $S_{10}$ the block designation for the 4×4 blocks is updated and the same processing as described above is carried out; namely, the resolution code $\phi_{ij}$ obtained in connection with the Y color plane is equally employed in the coding of the I and Q color planes.

Figure 12A:
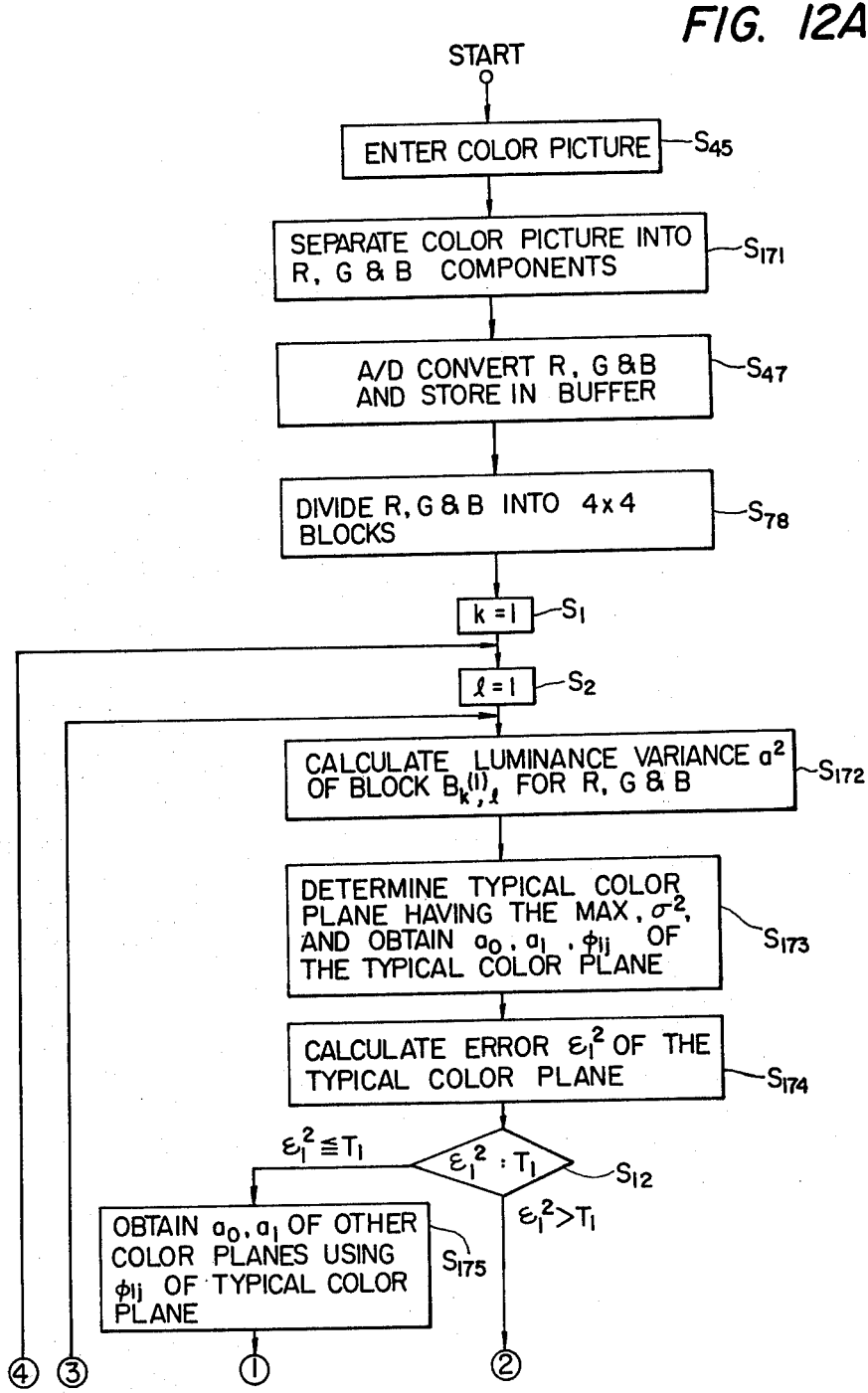
FIGS. 12A and 12B form a flowchart showing an example of coding which uses a resolution code of one of R, G and B color planes in common to them.
Figure 12B:
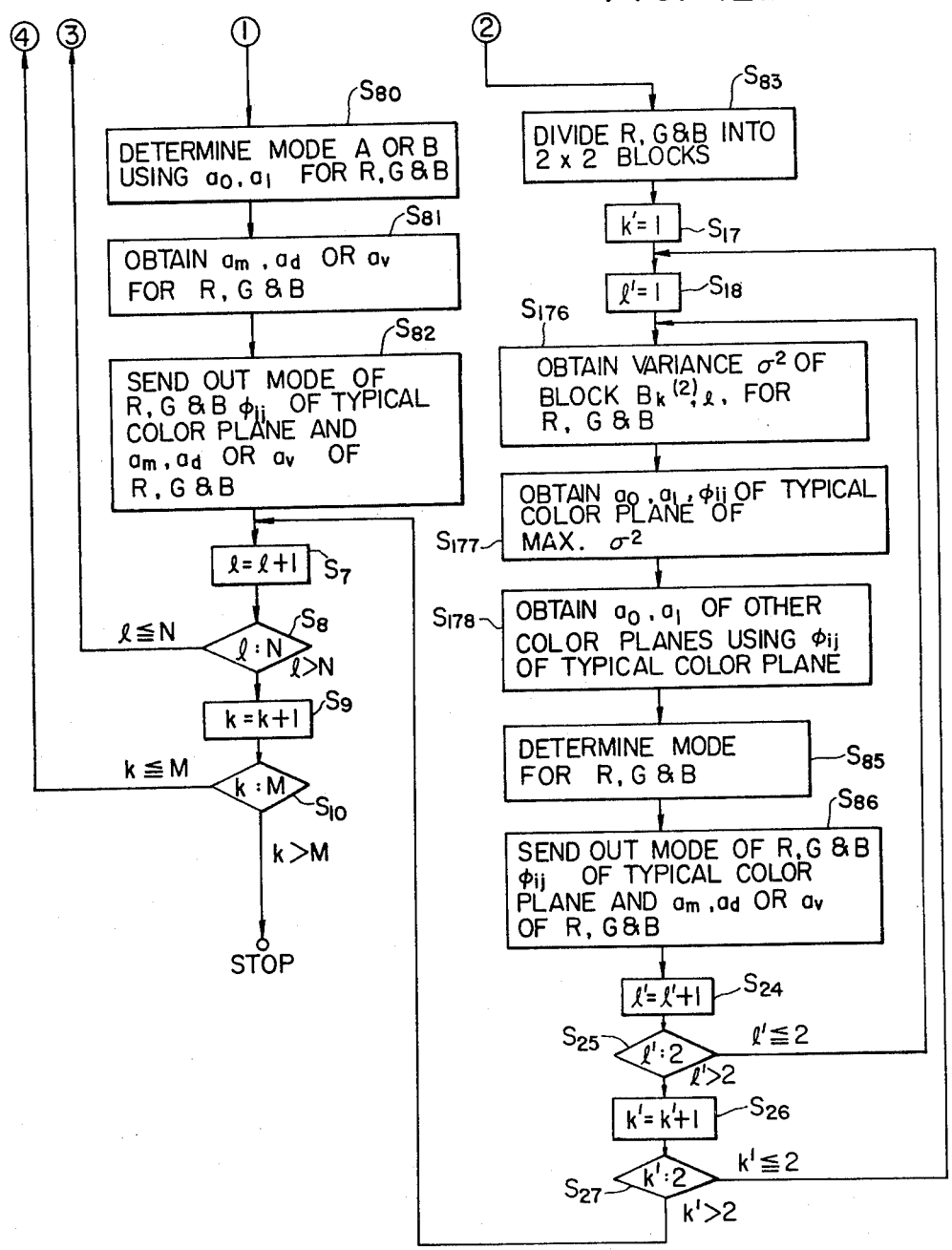

With this method, the amount of coded data of the resolution code is reduced as compared with the amount of coded data in the case where the resolution code is obtained for each color plane. In this case, the mode flag is needed for each color plane, but it requires only two bits for each block; hence, this does not present any problem in terms of the amount of coded data. The resolution code requires sixteen bits for the 4×4 block, and the amount of coded data is reduced by that difference. The same is true of the modes C and D of the 2×2 block. The method of employing the mode flag, referred to previously in connection with FIGS. 10A and B, in common to the respective planes is suitable for use with the R, G and B color planes for these color planes provide substantially the same picture as compared with the case of the Y, I and Q color planes. In the case of using one resolution code in common to the Y, I and Q color planes, it is advisable to utilize the resolution code of the Y color plane that is high in spatial frequency. The common use of the resolution code is also applicable to the case of a picture being separated into the R, G and B color planes. In this case, the resolution code $\phi_{ij}$ is obtained in respect of that one of the corresponding 4×4 blocks of the three color planes whose variance of the luminance of its sixteen pels is the largest, that is, whose gray level variation is larger than those of the blocks of the other color planes, and the resolution code $\phi_{ij}$ thus obtained is employed in common to the other color planes. This will hereinbelow be described with reference to FIGS. 12A and B showing a program flowchart of the above processing.

The program starts with step $S_{45}$ wherein a color picture is entered, which is separated into R, G and B color planes in step $S_{171}$. Then, in step $S_{47}$ each color plane is converted into a digital signal and loaded in a buffer. Each color plane is divided into 4×4 blocks in step $S_{78}$, and in steps $S_1$ and $S_2$ a coding start block is designated. In step $S_{172}$ variance $\sigma^2$ of the luminance is calculated in respect of the designated block $B_{k,l}$ of each color plane, and then in step $S_{113}$ that one of the three designated blocks whose variance $\sigma^2$ is the largest is obtained, and the codes $a_o$, $a_l$ and $\phi_{ij}$ are obtained in connection with the color plane corresponding to the block of the largest variance $\sigma^2$ (which color plane will hereinater be referred to as the typical color plane). Next, in step $S_{174}$ an error $\epsilon_1^2$ in the block of the typical plane is calculated, and in step $S_{12}$ the error $\epsilon_1^2$ is compared with a threshold $T_1$; in the case of the error $\epsilon_1^2$ being equal to or smaller than the threshold $T_1$, the program proceeds to step $S_{175}$ wherein the codes $a_o$ and $a_l$ of the corresponding blocks of the other two color planes through utilization of the resolution codes $\phi_{ij}$ of the typical color plane. In this case, however, unlike in the ordinary block coding, the average value of the luminance of an assembly of pels with the resolution code $\phi_{ij}=1$ is obtained as $a_l$ and the average value of the luminance of an assembly of pels with the resolution code $\phi_{ij}=0$ is obtained as $a_o$.

Figure 11A:
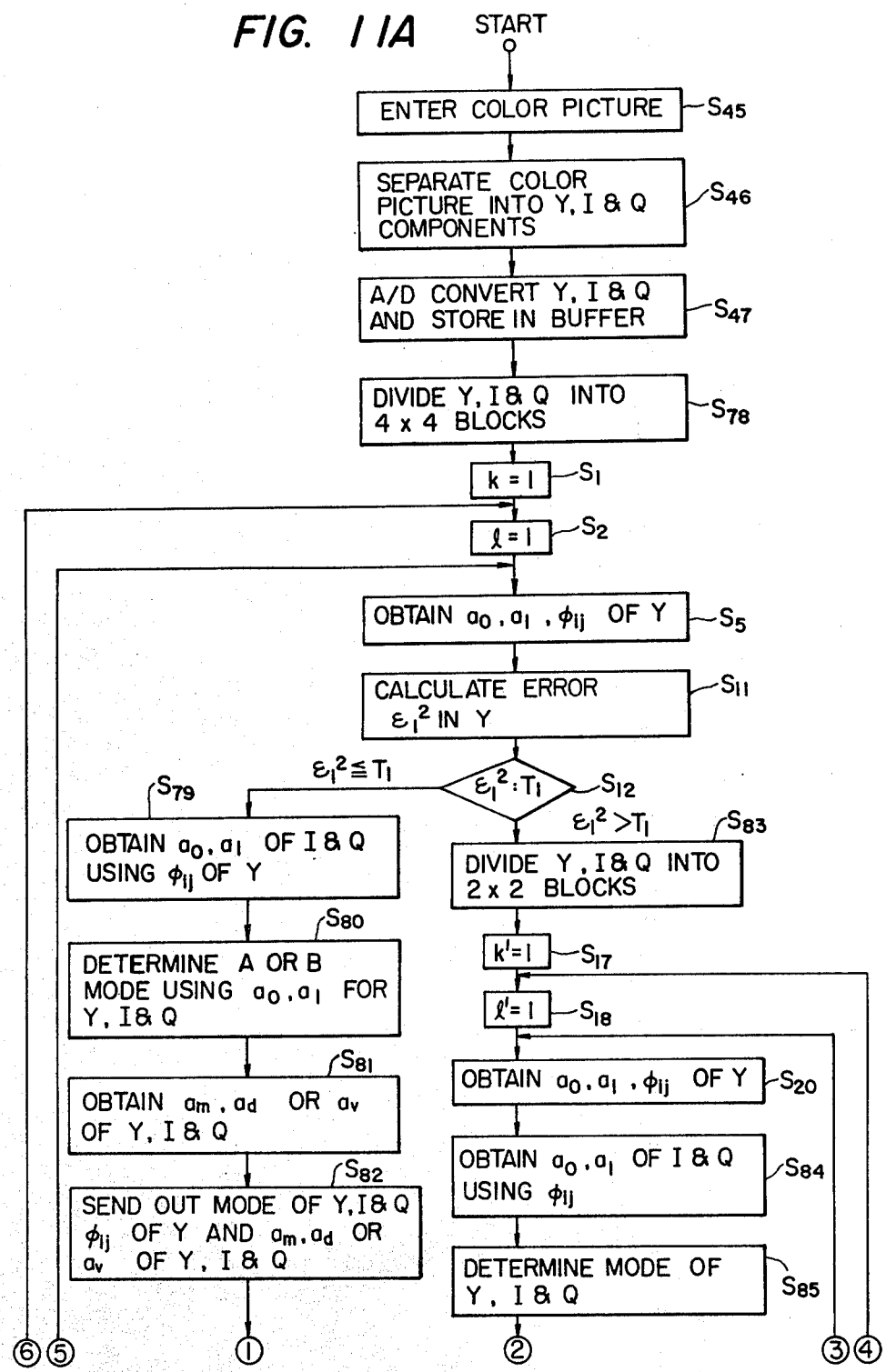
FIGS. 11A and 11B form a flowchart showing an example of coding using a resolution code of a Y color plane in common.

Then, the program proceeds to steps $S_{80}$, $S_{81}$ and $S_{82}$ corresponding to those in FIGS. 11A and B, wherein the mode of coding of each color plane is determined and the codes $a_m$, $a_d$ or $a_v$ are obtained, and further, the mode of each color plane, the resolution code $\phi_{ij}$ of the typical color plane and the codes $a_m$ and $a_d$ or $a_v$ of each color plane are sent out. Then, in steps $S_7$, $S_8$, $S_9$ and $S_{10}$ the blocks are designated one after another and, for each of them, the above operation is repeated. When the error $\epsilon_1^2$ is decided to be larger than the threshold $T_1$ in step $S_{12}$, then the program proceeds to step $S_{83}$, wherein the corresponding blocks of the respective color planes are each divided into 2×2 blocks. In steps $S_{17}$ and $S_{18}$ a coding start block in the 2×2 block region is designated. Then, in step $S_{176}$ the variance $\sigma^2$ of the luminance of the designated 2×2 block $B_{k'}^{(2)}{}_l$ of each color plane is obtained, and in step $S_{177}$ the typical color plane which provides the largest value of the variance $\sigma^2$ is subjected to block coding, obtaining the codes $a_o$, $a_l$ and $\phi_{ij}$. Next, in step $S_{178}$ the codes $a_o$ and $a_l$ of the other color planes are obtained using the resolution code $\phi_{ij}$ of the typical color plane. Also in this case, the average value of the luminance of an assembly of pels with the resolution code $\phi_{ij}=1$ is obtained as $a_l$ and the average value of the luminance of an assembly of pels with the resolution code $\phi_{ij}=0$ is obtained as $a_o$, as is the case with step $S_{175}$. Then, in steps $S_{85}$ and $S_{86}$ the mode of coding of each color plane is determined, and the mode of each color plane, the resolution code $\phi_{ij}$ of the typical color plane and the codes $a_m$ and $a_d$ or $a_v$ of each color plane are sent out as in the corresponding steps in FIGS. 11A and B. Thereafter, the program proceeds to steps $S_{24}$ to $S_{27}$, wherein the designation of the 2×2 blocks is updated and the same operation as described above is repeated for each designated block. When the content k' of the block counter becomes larger than 2 in step $S_{27}$, the program proceeds to step $S_7$.

Figure 13A:
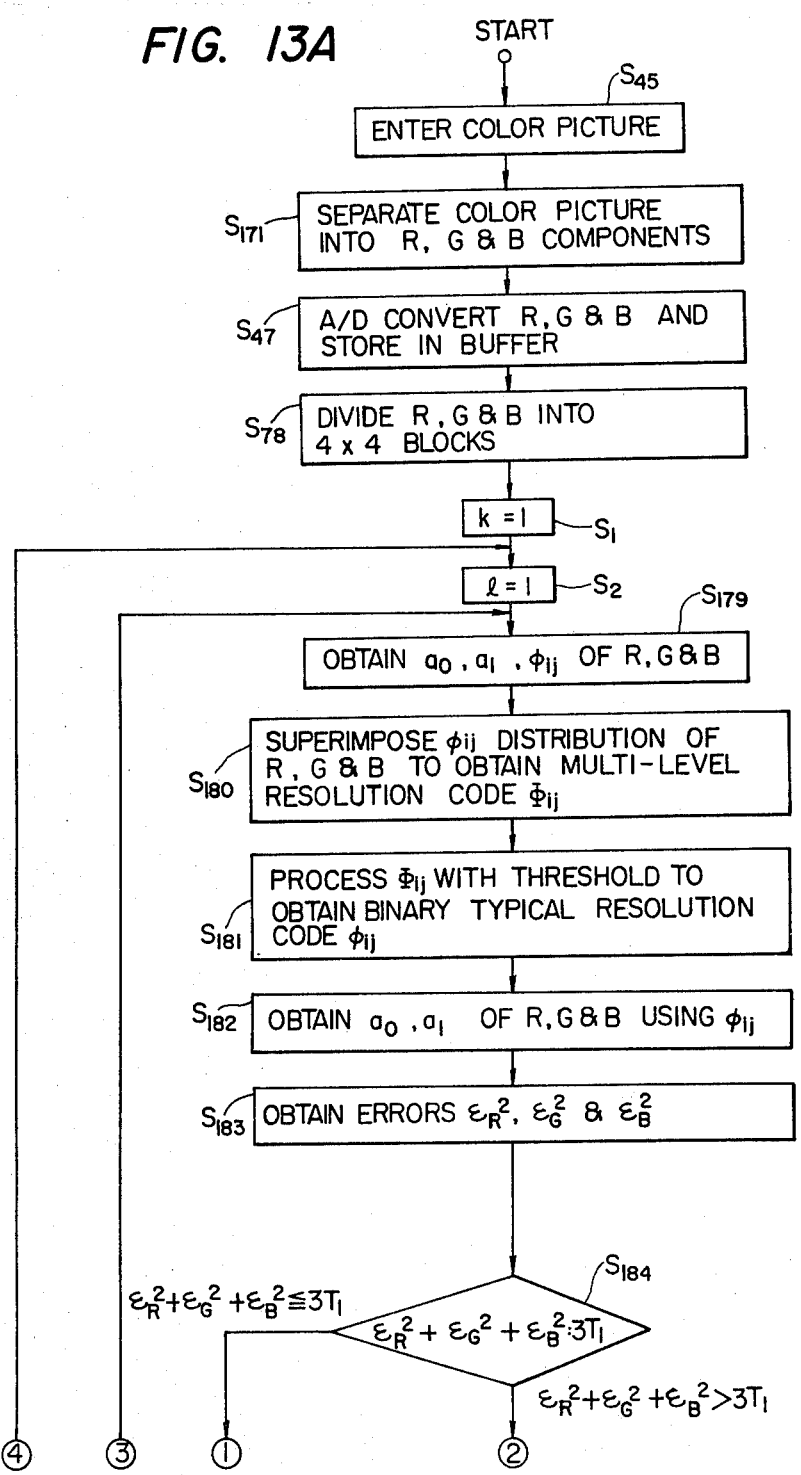
FIGS. 13A and 13B form a flowchart showing an example of coding in which a common typical resolution code is obtained from resolution of the R, G and B color planes and used in common to them.
Figure 13B:
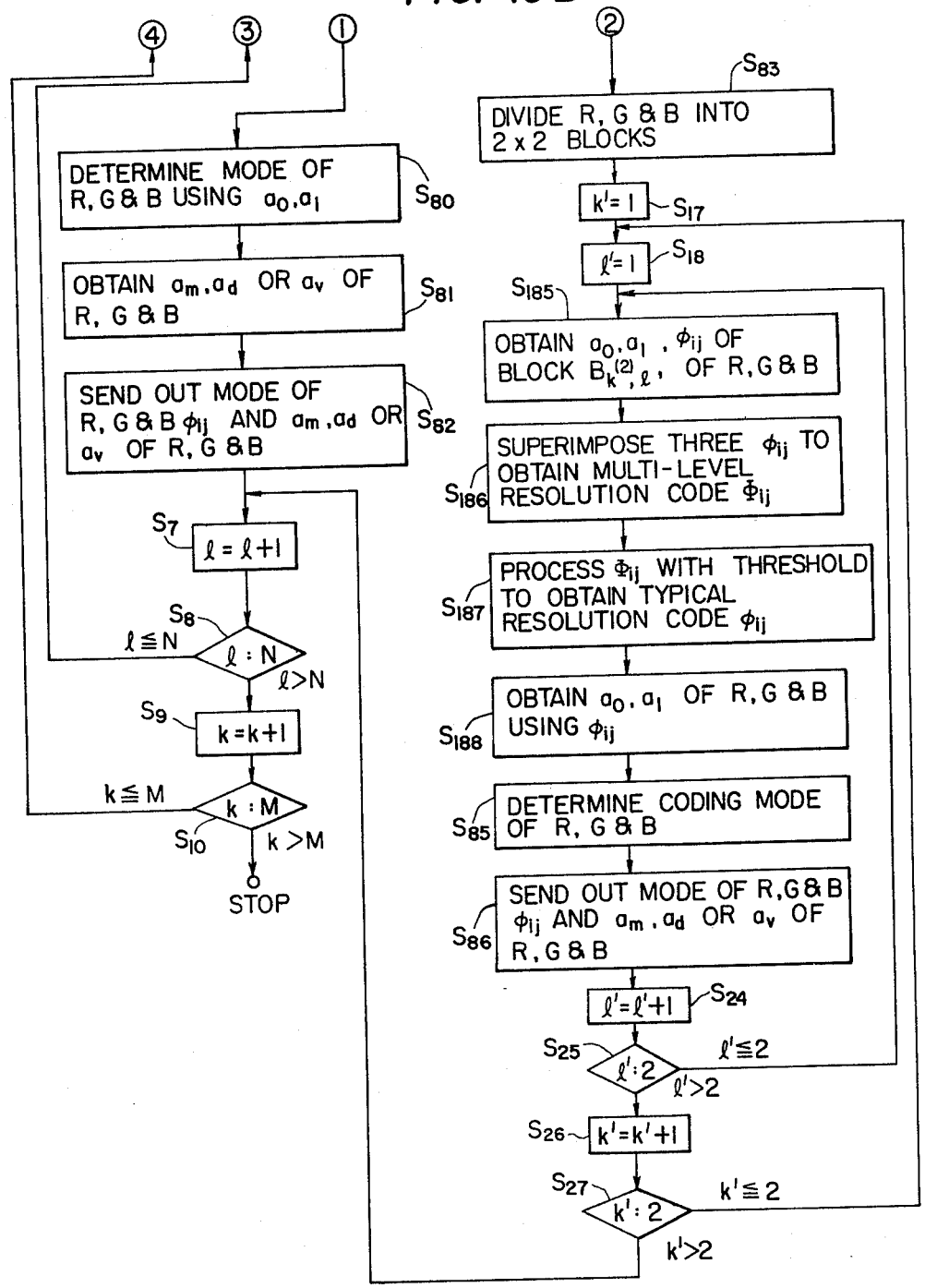

It is also possible to adopt such a method as follows: The resolution code $\phi_{ij}$ is obtained for each of the corresponding 4×4 blocks of the three color planes, and corresponding ones of bits of the three resolution codes are added together to produce a multi-level plane having levels 0 to 3. This multi-level plane is rendered into a level plane of levels 0 to 1 using a threshold, that is, the three resolution codes are averaged, and the average resolution code thus obtained is used in common to the corresponding blocks of the three color planes. This will hereunder be described with reference to FIGS. 13A and B, which show a program flowchart of the above operation. Steps $S_{45}$ to $S_2$ are identical with the corresponding ones in FIGS. 12A and B. In step $S_{179}$ the codes $a_o$, $a_l$ and $\phi_{ij}$ of the designated block of each color plane are obtained. Then, in step $S_{180}$ the distributions of the resolution code $\phi_{ij}$ of the respective color planes are superimposed one on another to obtain a multi-level resolution plane $\phi_{ij}$ having values 0 to 3. In step $S_{181}$ the multi-level resolution plane $\phi_{ij}$ is processed with a threshold value to obtain a binary typical resolution component $\phi_{ij}$, and in step $S_{182}$ the codes $a_o$ and $a_l$ of each of the corresponding blocks of each color plane are obtained through utilization of the typical resolution component $\phi_{ij}$. In this case, the average luminance value of a pel assembly of the resolution component $\phi_{ij}=1$ is $a_l$, and the average luminance value of a pel assembly of the resolution component $\phi_{ij}=0$ is $a_o$. Then, in step $S_{183}$ errors $\epsilon_R^2$, $\epsilon_G^2$ and $R_B^2$ are calculated for each plane using the codes obtained, and in step $S_{184}$ the sum of all the errors is compared with a threshold $3T_1$. When the sum of the errors is equal to or smaller than the threshold $3T_1$, the program proceeds to step $S_{80}$ wherein the mode of coding of each color plane is determined using the codes $a_o$ and $a_l$, and in step $S_{81}$ the codes $a_m$, $a_d$ or $a_v$ are obtained for each color plane, and then in step $S_{82}$ the mode of each color plane, the typical resolution component $\phi_{ij}$ and the code $a_m$, $a_d$ or $a_v$ are obtained for each color plane, and then in step $S_{82}$ the mode of each color plane, the typical resolution component $\phi_{ij}$ and the code $a_m$, $a_d$ or $a_v$ are sent out. The block designation is updated in steps $S_7$ to $S_{10}$ and the same operation as described above is repeated. In the case where the sum of the errors is larger than the threshold $3T_1$ in step $S_{184}$, the program proceeds to step $S_{83}$, wherein the corresponding blocks of the respective color planes are each divided into 2×2 blocks. In steps $S_{17}$ and $S_{18}$ one of the 2×2 blocks of each color plane is designated, and in step $S_{185}$ the codes $a_o$, $a_l$ and $\phi_{ij}$ of the designated block are obtained. In step $S_{186}$ a multi-level resolution plane $\Phi_{ij}$ is produced as is the case with the step $S_{180}$, and in step $S_{187}$ a typical resolution code $\phi_{ij}$ is obtained as in step $S_{181}$. Then in step $S_{188}$ the codes $a_o$ and $a_l$ of each of the corresponding 2×2 blocks of the respective color planes are obtained using the typical resolution code $\phi_{ij}$. In this case, the average luminance value of a pel assembly of the resolution code $\phi_{ij}=1$ is $a_l$ and the average luminance value of a pel assembly of the resolution code $\phi_{ij}=0$ is $a_o$. Next, the program proceeds to step $S_{85}$ the mode of coding of each color plane is determined in connection with that 2×2 block, and in step $S_{86}$ the mode of each color plane, the typical resolution code $\phi_{ij}$ and the code $a_m$, $a_d$ and $a_v$ of each color plane are sent out. In steps $S_{24}$ to $S_{27}$ the 2×2 blocks are sequentially designated and, for each designated block, the same processing as described above is repeated; and after processing of the four 2×2 blocks, the program proceeds to step $S_7$.

Figure 14:
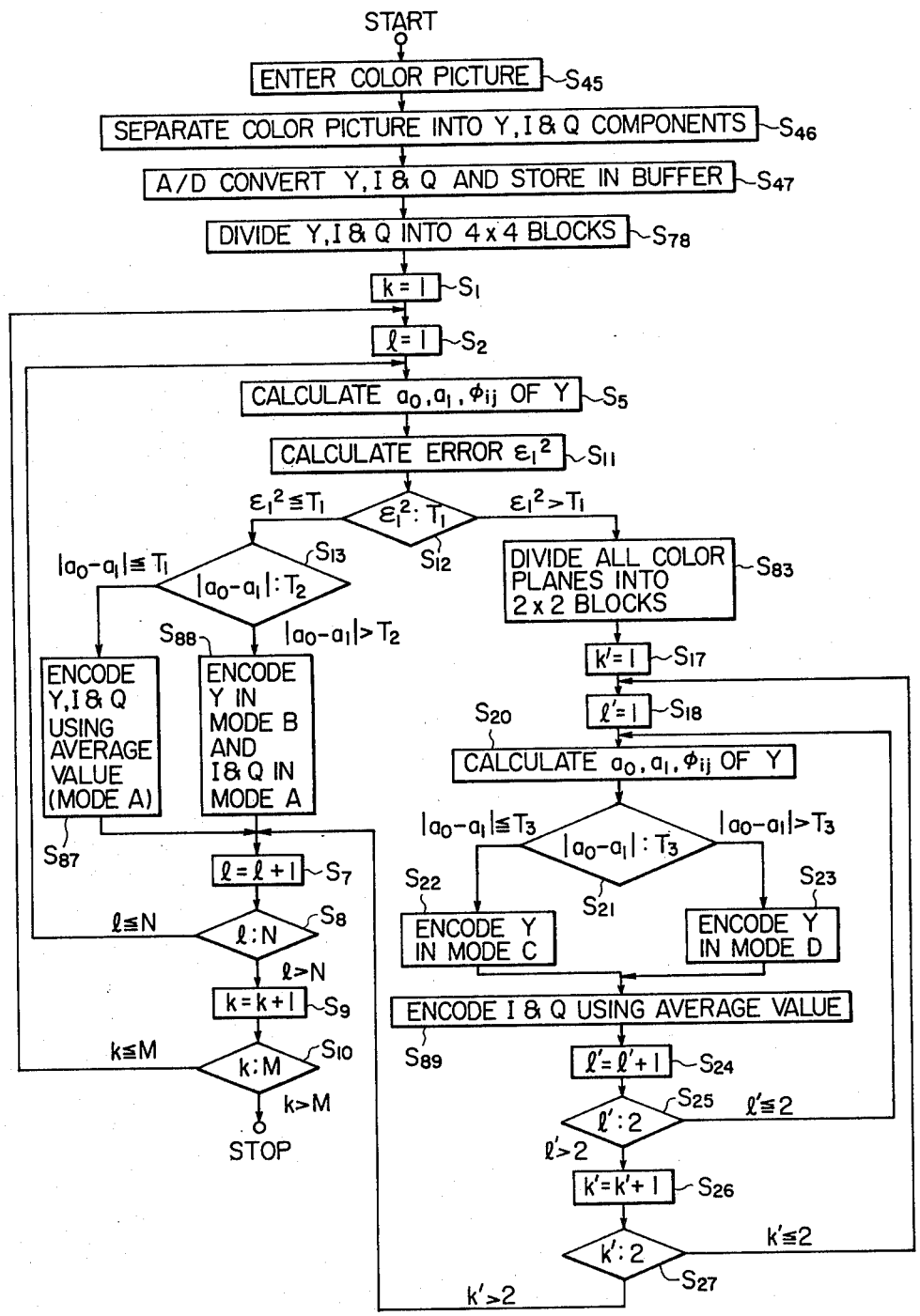
FIG. 14 is a flowchart showing an example of coding in which I and Q color planes are divided into blocks in accordance with the Y color plane and the blocks of the I and Q color planes are also encoded using mean gray level codes.

In the case of separating a color picture into the Y, I and Q color planes, the coding efficiency can be enhanced by encoding the I and Q color planes only with an average value of their gray levels since they are smaller in the gray level fluctuation than the Y color plane. FIG. 14 shows, by way of example, a program flowchart of this operation. Since the program is substantially identical with that of FIGS. 11A and B, a description will be made of differences between them alone. When it is decided in step $S_{12}$ that $\epsilon_1^2 \leq T_1$, the program proceeds to step $S_{13}$ wherein it is checked whether the mode of coding is A or B. In the case of mode A, the average gray level code $a_v$ of each of the Y, I and Q color planes is obtained and the program proceeds to step $S_7$. If it is decided in step $S_{13}$ that the mode of coding is B, the Y color plane is encoded in mode B, that is, the gray level code and the resolution code of the Y color plane are outputted, and the I and Q color planes are encoded in mode A, that is, only the average gray level code is obtained, and then the program proceeds to step $S_7$. Further, in step $S_{21}$ it is checked whether the mode of coding is C or D, and in the case of mode C, only the Y color plane is encoded in mode C in step $S_{22}$, whereas in the case of mode D, only the Y color plane is encoded in mode D in step $S_{23}$. After steps $S_{22}$ and $S_{23}$, the average gray level code is obtained in respect of the I and Q color planes in step $S_{89}$, and then the program proceeds to step $S_{24}$.

Figure 15:
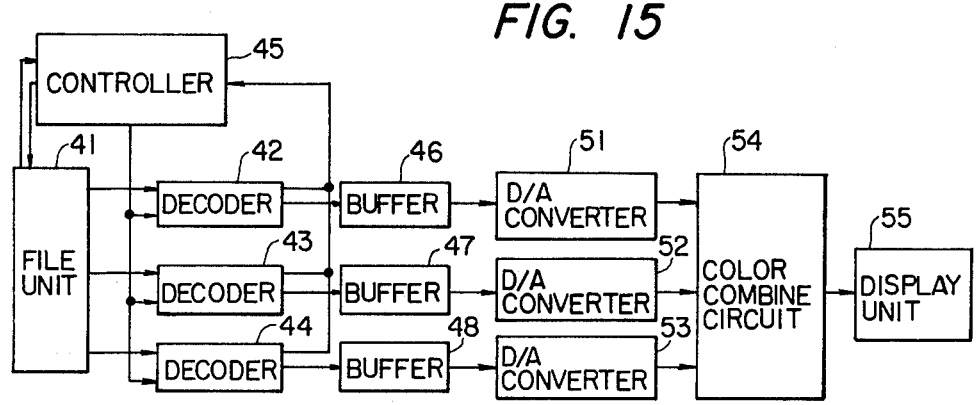
FIG. 15 is a block diagram illustrating, by way of example, a decoding equipment embodying this invention.

As described above, the block coding can be achieved in various ways. Now, a description will be given of the decoding of color picture information coded as described above. FIG. 15 illustrates an example of a color picture decoding equipment, in which the coded color picture information is stored in a file unit 41 for each color picture. A desired one of the color pictures is read out from the file unit 41 and supplied to decoders 42, 43 and 44, wherein it is decoded for each color plane. Control of this decoding is accomplished in relation to control of the file unit 41 under control of a controller 45. If the color information thus read out is one that has been encoded for each of the three color planes, the decoders 42 to 44 perform the decoding operation independently. If, however, the color picture information read out is one that has been encoded using the mode flag, the block size switching information or the resolution code $\phi_{ij}$ in common to the three color planes, the common information is transmitted and received among the decoders 42 to 44 through the controller 45 in the decoding. The controller 45 reads out from the file unit 41 information indicating which one of the various coding schemes was used, and directs the decoders 42 to 44 to perform decoding processing fit for the coding scheme used. The information decoded by the decoders 42 to 44 is temporarily stored in buffers 46, 47 and 48 and then read out therefrom to be provided to D/A converters 51 and 53 for conversion to analog signals. The analog signals of the respective color planes are combined by a color combine circuit 54 into a composite signal, which is stored in its internal buffer, and the composite signal is repeatedly read out therefrom and displayed as a color picture in a display unit 55.

Figure 18:
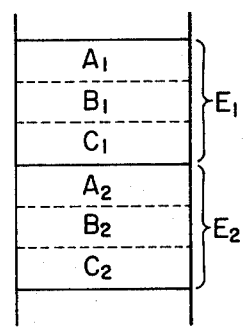
FIG. 18 is a diagram showing by way of example, stored data formats of the coded data of FIG. 15 in the file unit.
Figure 16:
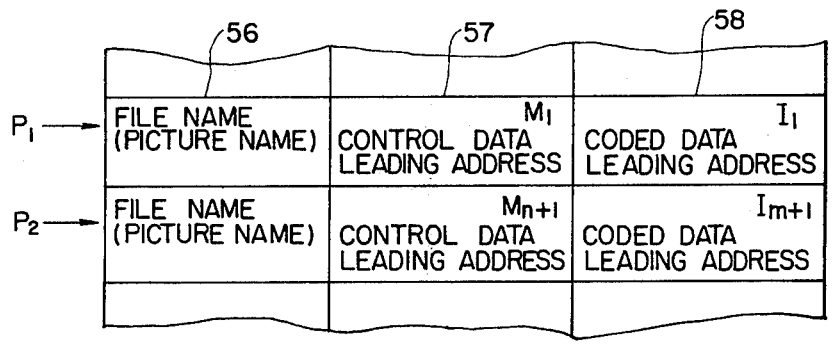
FIG. 16 shows, by way of example, stored data format of picture coded information in a file unit.
Figure 16:
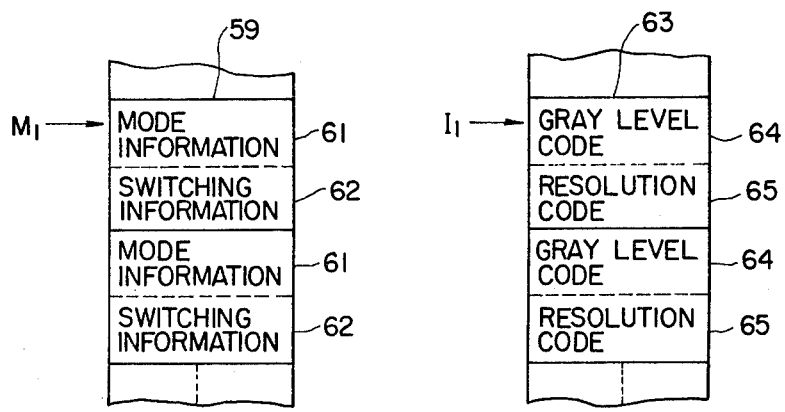

In the file unit 41 there are areas which are respectively assigned addresses $P_1$, $P_2$ . . . as shown in FIG. 16 and each of which has a file-name area 56 which stores, for example, numbers or the like representing a picture, a control data leading address part 57 containing a leading address, for example, $M_1$ of the area storing control data, and a code address part 58 containing a leading address, for example, $I_1$ of the area in which is stored coded data of a particular picture. Let a file name, or a picture name, be represented by its address P. Designating a particular file name, its control data address M and coded data address I are read out. In a control data area 59, mode information (mode A, B, C and D) 61 and block switching information ($D_1$ and $D_2$) 62 of respective pictures are stored in a predetermined order. That is, control data of a picture name $P_1$ is stored at the address $M_1$ and the immediately succeeding address. In the coded data area 63, coded data of the respective pictures, that is, their gray level codes 64 and resolution codes 65 are stored in a predetermined order. For example, the coded data of the picture name $P_1$ is stored at the address $I_1$ and the immediately succeeding address $I_1$. The control and the coded data are stored in the following manner. For instance, assuming that the three color planes 12, 13 and 14 are respectively divided into maximum block size ($8 \times 8$ or $4 \times 4$) regions $17a_1$, $17a_2$, . . . , $17b_1$, $17b_2$, . . . and $17c_1$, $17c_2$, . . . then data $A_1$, $A_2$, . . . , $B_1$, $B_2$, . . . and $C_1$, $C_2$, . . . of these blocks $17a_1$, $17a_2$ . . . $17b_1$, $17b_2$ . . . and $17c_1$, $17c_2$, . . . are stored in a predetermined order of block an for each set of corresponding blocks, as depicted in FIG. 18. For example, the data $A_1$, $B_1$ and $C_1$ are stored in a memory area $E_1$ and the data $A_2$, $B_2$ and $C_2$ are stored in the next memory area $E_2$.

Figure 19:
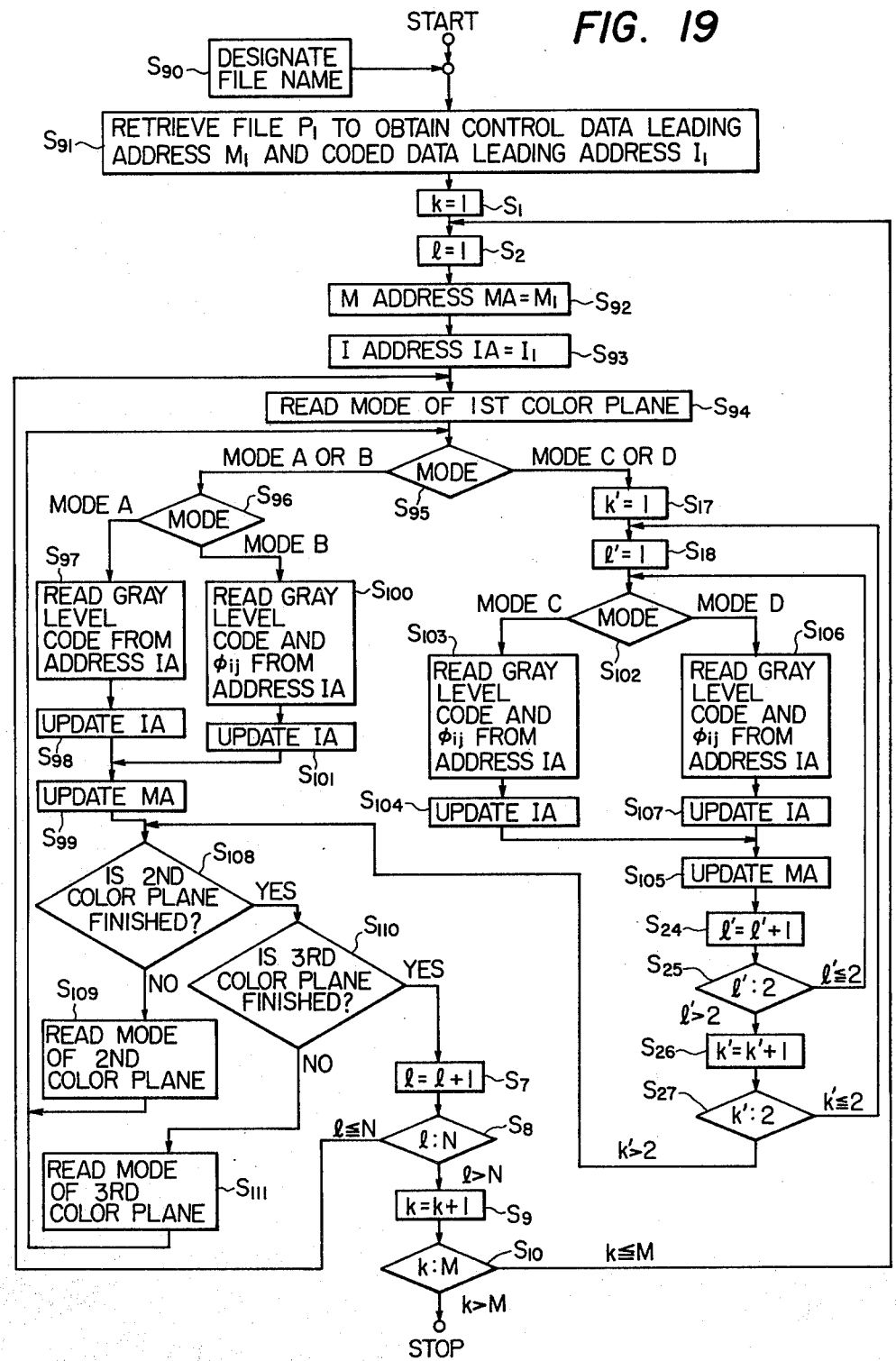
FIG. 19 is a flowchart showing an example of processing for reading data from the file unit.

The decoders 42 to 44 and the controller 45 of the decoding equipment shown in FIG. 15 can also be activated easily by the use of a microcomputer. The read-out processing of the file unit 41 takes place, for example, as shown in FIG. 19. When the file name $P_1$ to be read out of the file unit 41 is designated in step $S_{90}$, the program proceeds to step $S_{91}$, wherein the address $P_1$ of the designated file name is read out and then the content $M_1$ of the control address part and the content $D_1$ of the coded address part are read out. Since decoding is performed in the order in which the respective parts of the color plane were encoded, a decoding start block is designated in steps $S_1$ and $S_2$, and in step $S_{92}$ the leading address $M_1$ of the control data address detected first is set in a control address register MA, and in step $S_{93}$ the leading address $I_1$ of the coded data address is set in a code address register IA. In step $S_{94}$ the mode of a first color plane is read out in accordance with the content $M_1$ of the control address register. In step $S_{95}$ it is checked whether the mode read out in step $S_{94}$ is A, B or C, D; if the mode is A or B, the program proceeds to step $S_{96}$ wherein it is checked whether the mode is A or B. In the case of mode A, the content $I_1$ of the code address register IA is designated to read from the file 41 the amount of coded data of the gray level code $a_\nu$ alone, and in step $S_{98}$ the content of the code address register IA is updated to the next read-out address, and further, in step $S_{99}$ the content of the control address register MA is updated to the next read-out address. If it is decided in step $S_{96}$ that the mode of the first color plane is B, the program proceeds to step $S_{100}$, in which the content of the code address register IA is designated to read out from the file 41 the required amount of coded data of the gray level code and the resolution code $\phi_{ij}$. Then, in step $S_{101}$ the content of the code address register IA is updated, and the program proceeds to step $S_{99}$. In the case where it is decided in step $S_{95}$ that the mode of the color plane is C or D, the program proceeds to steps $S_{17}$ and $S_{18}$, in which a first block designation is effected in respect of a block region divided from a predetermined block of the maximum block size of the color plane. Then, in step $S_{102}$ it is checked whether the mode of the control data previously detected is C or D. If the mode is C, the program proceeds to step $S_{103}$, in which the gray level code and the resolution code are read out of the code address register IA by an amount of coded data corresponding to the mode. Next, in step $S_{104}$ the content of the code address register IA is updated, and in step $S_{105}$ the content of the control address register MA is updated. Where the mode of the control data is decided to be D in step $S_{102}$, the program proceeds to step $S_{106}$, wherein the gray level code and the resolution code stored in the address designated by the address register IA are read out, and in step $S_{107}$ the content of the code address register IA is updated, and then the program proceeds to step $S_{105}$. In steps $S_{24}$ to $S_{27}$ the divided blocks are successively designated and, for each block, the decision of the mode C or D, the read-out of the gray level code and the resolution code and the update of the content of the code address register IA are carried out. When it is detected in step $S_{27}$ that the read-out of the coded data of all the divided blocks has been completed, the program proceeds to step $S_{108}$, in which it is checked whether read-out of a second color plane has been completed or not; if not, the control data, or the mode of the second color plane is read out, and then the program proceeds to step $S_{95}$. Step $S_{99}$ is also followed by $S_{108}$. If it is decided in step $S_{108}$ that read-out of the second color plane has been finished, then it is checked in step $S_{110}$ whether read-out of third color plane has been completed; if not, control data of the third color plane is read out in step $S_{111}$, and then the program proceeds to step $S_{95}$. When it is decided in step $S_{110}$ that read-out of the third color plane has been finished, then the maximum blocks are designated one after another in step $S_7$ to $S_{10}$, and for each block, the program proceeds to step $S_{94}$, in which, as described previously, the control data for the block of each color plane is read out and the coded data is read out by an amount dependent on the control data, completing read-out for all the blocks. These read out data are stored in buffers of the decoders 42, 43 and 44 for each color plane.

Figure 20:
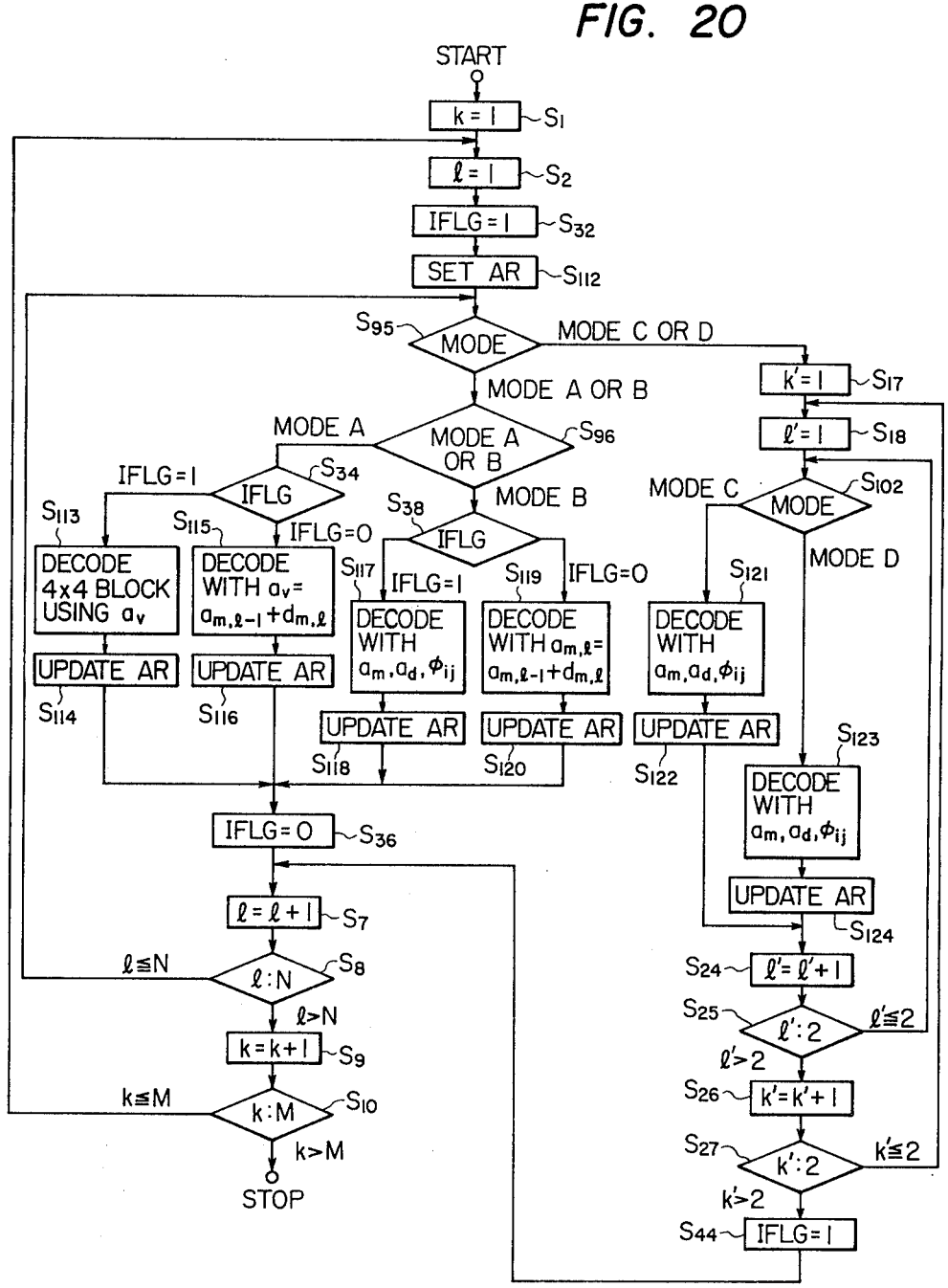
FIG. 20 is a flowchart showing an example of decoding of adaptive coded data.

In the manner described above, the control data and the coded data are read out from the file unit for each color plane. Next, a description will be given of decoding the color plane using the data read out as described above. The following will describe first the decoding of data encoded by the adaptive coding described previously in respect of FIG. 7. This decoding is also applicable to coded data of a monochromatic picture. Referring now to FIG. 20, the decoding of data of one color plane will be described. The decoding takes place in the order of coded blocks while identifying the mode of their coding. Accordingly, in steps $S_1$ and $S_2$ a decoding start block is designated; in step $S_{32}$, the initializing flag IFLG is made 1; and in steps $S_{112}$, the address of the file in which coded data was stored by the aforesaid entering of the codes for each color plane is set in an address register AR. In step $S_{95}$ it is checked whether the control code, i.e. the mode information of the designated block is A, B or C, D; in the case of mode A or B, it is checked in step $S_{96}$ whether the mode is A or B. If the mode A is decided, the initializing flag IFLG is checked in step $S_{34}$, and if the initializing flag IFLG is 1 which indicates an initializing block, the program proceeds to step $S_{113}$, in which the 4×4 block is decoded as the average gray level code through utilization of the gray level codes read out in accordance with the content of the address register AR. Then, in step $S_{114}$ the content of the address register AR is updated to the address to be read out next. Thereafter, the initializing flag IFLG is made 0 in step $S_{36}$. In the case where it is decided in step $S_{34}$ that the initializing flag IFLG is 0, then the program proceeds to step $S_{115}$, wherein the gray level code $a_m$ is entered by the designation of the address register AR and $a_{m,l-1} + d_{m,l}$ is calculated and decoded as the average gray level code. Next, in step $S_{116}$ the content of the address register AR is updated, and the program proceeds to step $S_{36}$. Where the mode information of the designated block is decided to be B in step $S_{96}$, the initializing flag IFLG is checked in step $S_{38}$. In the case of the initializing flag IFLG being 1, the program proceeds to step $S_{117}$, in which the gray level codes $a_m$ and $a_d$ and the resolution code $\phi_{ij}$ are entered in accordance with the content of the address register AR and are decoded. Then, the content of the address register AR is updated in step $S_{118}$, which is followed by step $S_{36}$. Since the kind of mode is preknown, the amount of coded data to be entered in accordance with the content of the address register AR is known. That is to say, in the case of mode A, the data for the gray level code is entered; and in the case of mode B, the data for the gray level codes and the resolution code are entered. When it is decided in step $S_{38}$ that the initializing flag IFLG is 0, the program proceeds to step $S_{119}$ in which the gray level codes and the resolution code are entered in accordance with the content of the address counter AR and the gray level code, $a_{m,-l} = A_{m,l-1} + d_{m,l}$, is calculated and decoding is performed by this gray level code and the entered codes $a_d$ and $\phi_{ij}$. Next, in step $S_{120}$ the content of the address counter AR is updated, and then the program proceeds to step $S_{36}$. When it is decided in step $S_{95}$ that the mode information is C or D, the small blocks are designated, that is, respective codes of the mode information are identified by the contents k, l, k' and l' of the block counters, and it is checked in step $S_{102}$ whether the mode is C or D. In the case of mode C, the program proceeds to step $S_{121}$ in which the gray level codes $a_m$ and $a_d$ and the resolution code $\phi_{ij}$ are entered in accordance with the content of the address register AR and decoded. Then, in step $S_{122}$ the content of the address register AR is updated. Next, in steps $S_{24}$ to $S_{27}$ the blocks are successively designated; and the mode information corresponding to each designated block is entered and decided; and in accordance with the mode, the coded data is entered and decoded. In the event that the mode D is decided in step $S_{102}$, the program proceeds to step $S_{123}$, in which the gray level codes $a_m$ and $a_d$ and the resolution code $\phi_{ij}$ are entered in accordance with the content of the address register AR and decoded. In this case, the gray level codes are shorter in code length than those in the case of mode C. Next, in step $S_{124}$ the content of the address register AR is updated, and then the program proceeds to step $S_{24}$. When the respective parts of the divided block have thus been decoded, the initializing flag IFLG is made 1 in step $S_{44}$, and the program proceeds to step $S_7$. By steps $S_7$ to $S_{10}$, the block designation is updated, that is, the mode information is read out for each block in a sequential order and the coded data in an amount corresponding to the mode information is read from the file designated by the address register AR and then the decoding operation is carried out. Generally, the read out from the file unit 41 may be performed while executing the process of decoding thereby to avoid the repetition of the similar processes and to reduce the necessary memory capacity of the buffer in the detector.

Figure 21:
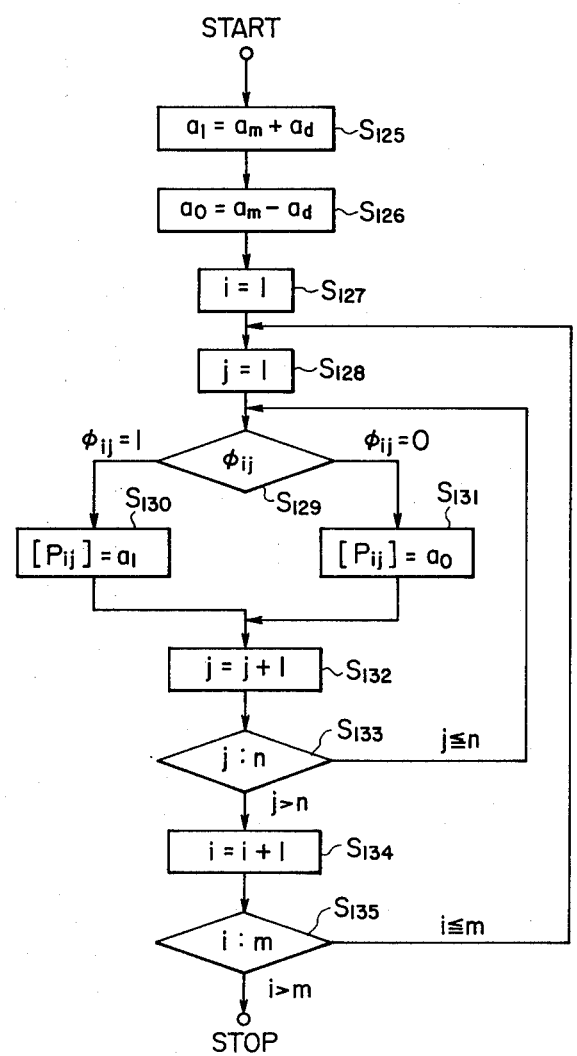
FIG. 21 is a flowchart showing an example of decoding processing in a block.

In the manner described above, gray level codes and the resolution code are decoded in each block and the decoding operation is effected; but as described previously, in steps $S_{113}$ and $S_{115}$ the mode is A, only the average gray level code $a_v$ is encoded and the gray level of each pel of that block is decoded to $a_v$. In the other steps $S_{117}$, $S_{119}$, $S_{121}$ and $S_{123}$, the sum gray level code $a_m$ and the difference gray level code $a_d$ are decoded for each block, and at the same time, the resolution code is obtained, and by these codes, the pel information is decoded for each block. FIG. 21 shows an example of a program flowchart for such decoding operation in each block.

The program starts with step $S_{125}$ in which the decoded sum and difference gray level codes $a_m$ and $a_d$ are added to obtain the gray level code $a_l$. Then, in step $S_{126}$ $a_m - a_d$ is calculated to obtain the gray level code $a_o$. In steps $S_{127}$ and $S_{128}$ a predetermined pel in the block, for example, a pel at the left upper end of the block is designated, that is, i=1 and j=1 are set up. In step $S_{129}$ the resolution code $\phi_{ij}$ of the designated pel is checked, and if it is 1, the program proceeds to step $S_{130}$ in which the luminance or gray level [Pij] of the pel is made $a_l$. If the resolution code $\phi_{ij}$ is 0, the program proceeds to step $S_{131}$ in which the gray level [Pij] is made $a_o$. Next, in step $S_{132}$ a column designation value j for the pel position is added with 1, and it is checked in step $S_{133}$ whether the added value is in excess of a maximum value n; if j≦n the program proceeds to step $S_{129}$ wherein the resolution code $\phi_{ij}$ designated by i and j is checked and the same processing as described above is performed. If j>n in step $S_{133}$, a row designation value i for the pel position is added with 1, and it is checked in step $S_{135}$ whether the new row designation value i is larger than a maximum value m. If i≦m, the program proceeds to step $S_{128}$, and if i>m, the decoding operation of that block is finished. In this way, $a_l$ or $a_o$ is assigned to each pel in accordance with the resolution code $\phi_{ij}$.

Figure 10B:
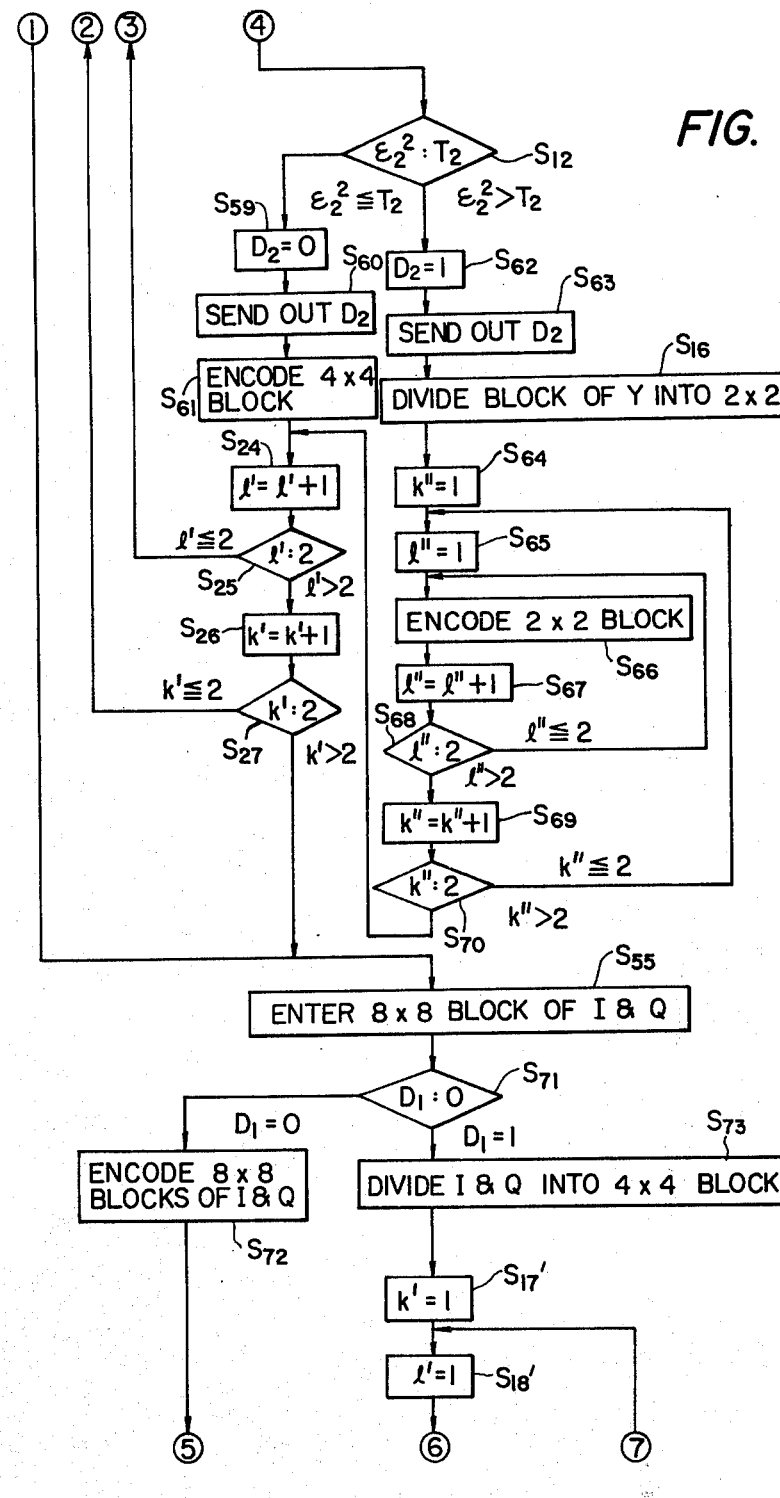
Figure 10C:
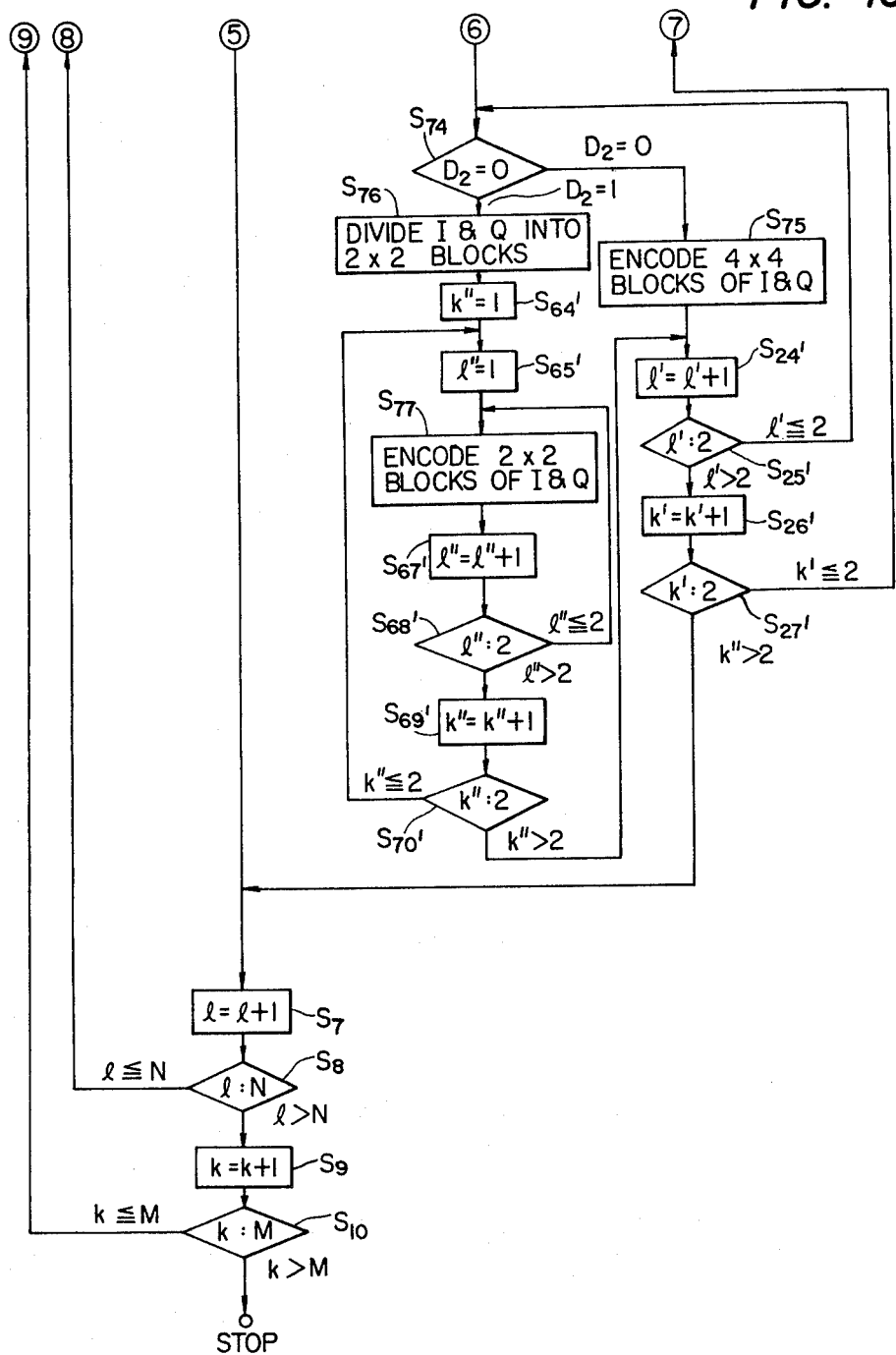
Figure 22:
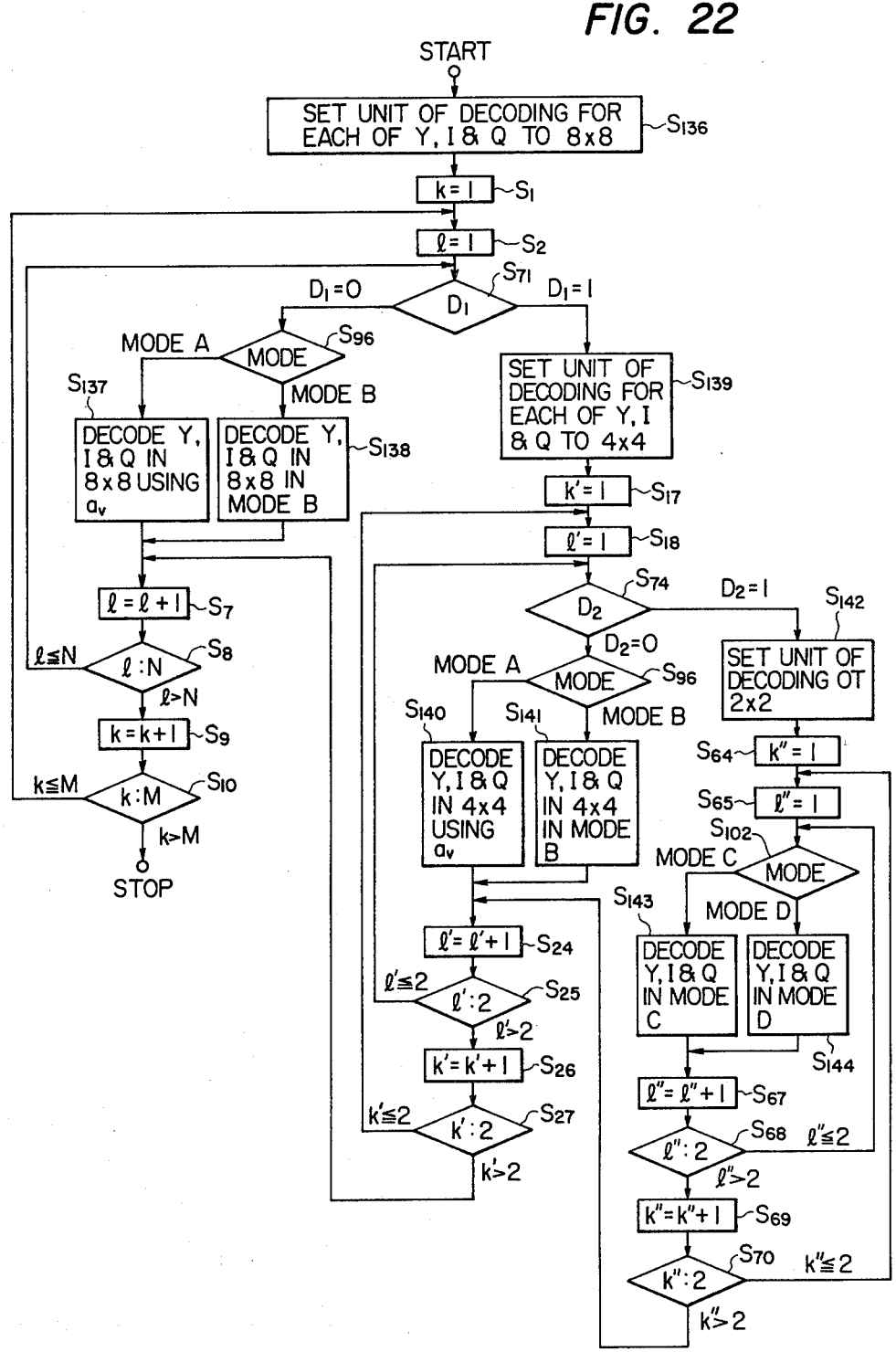
FIG. 22 is a flowchart showing an example of decoding processing for codes encoded using mode information in common thereto.

Next, a description will be made of the decode processing in the case where various information is common to the respective color planes. FIG. 22 shows a program flowchart for decoding of the codes encoded using mode flags, i.e. the mode information A, B, C and D in common to the three color planes as described previously in connection with FIG. 10. The program starts with step $S_{136}$ wherein the decoding unit of each of the Y, I and Q color planes is set to 8×8. In steps $S_1$ and $S_2$ a decoding start block is designated, and in step $S_{71}$ the block size switching information $D_1$ is checked; if $D_1 = 0$, the mode information is checked in step $S_{96}$.

In the case of mode A, the designated 8×8 block of each of the Y, I and Q color planes is decoded using its gray level codes as the average gray level code $a_v$ in step $S_{137}$, and the program proceeds to step $S_7$. When mode B is decided in step $S_{96}$, the program proceeds to step $S_{138}$ wherein the designated 8×8 block of each color plane is decoded in mode B, that is, the block is decoded using the gray level codes and the resolution code as described previously in connection with step $S_{117}$ or $S_{119}$ in FIG. 20. Thereafter, the program proceeds to step $S_7$. By steps $S_7$ to $S_{10}$, the blocks are designated one after another and decoded. When the block size switching information $D_1$ is 1 in step $S_{71}$, the decoding unit of the Y, I and Q color planes is changed to 4×4 in step $S_{139}$. The block designation corresponding to the divided medium-sized block takes place in steps $S_{17}$ and $S_{18}$, and in step $S_{74}$ the block size switching information $D_2$ is checked in respect of the designated medium-sized block. If $D_2=0$, the mode information is checked in step $S_{96}$, and in the case of mode A, the 4×4 medium-sized block of each of the Y, I and Q color planes is decoded using its gray level codes as the average gray level code in step $S_{140}$, and then the program proceeds to step $S_{24}$. When mode B is decided in step $S_{96}$, the 4×4 medium-sized block of each color plane is decoded in mode B using its coded data in step $S_{141}$, and the program proceeds to step $S_{24}$. By steps $S_{24}$ to $S_{27}$, the medium-sized blocks are designated one another another and, for each block, the block size switching information $D_2$ and the mode information are checked and the block is decoded in accordance with the mode. After decoding of the four medium-sized blocks, the program proceeds to step $S_7$. In the case where it is decided in step $S_{74}$ that the block size switching information is 1, the decoding unit of each of the Y, I and Q color planes is changed to 2×2. In the divided small block region, a block is designated in steps $S_{64}$ and $S_{65}$, and in step $S_{102}$ the mode information of the designated small block is checked. If the mode information is decided to be mode C, the designated small block of each of the Y, I and Q color planes is decoded in mode C, and the program proceeds to step $S_{67}$. When the mode information is decided to be D in step $S_{102}$, the designated small block of each of the Y, I and Q color planes is decoded in mode D in step $S_{144}$, and then the program proceeds to step $S_{67}$. By steps $S_{67}$ to $S_{76}$ the small blocks are designated one after another, and for each of them, the mode information is checked and the small block is decoded in accordance with the mode information. After decoding of the four small blocks, the program proceeds to step $S_{24}$.

Figure 11B:
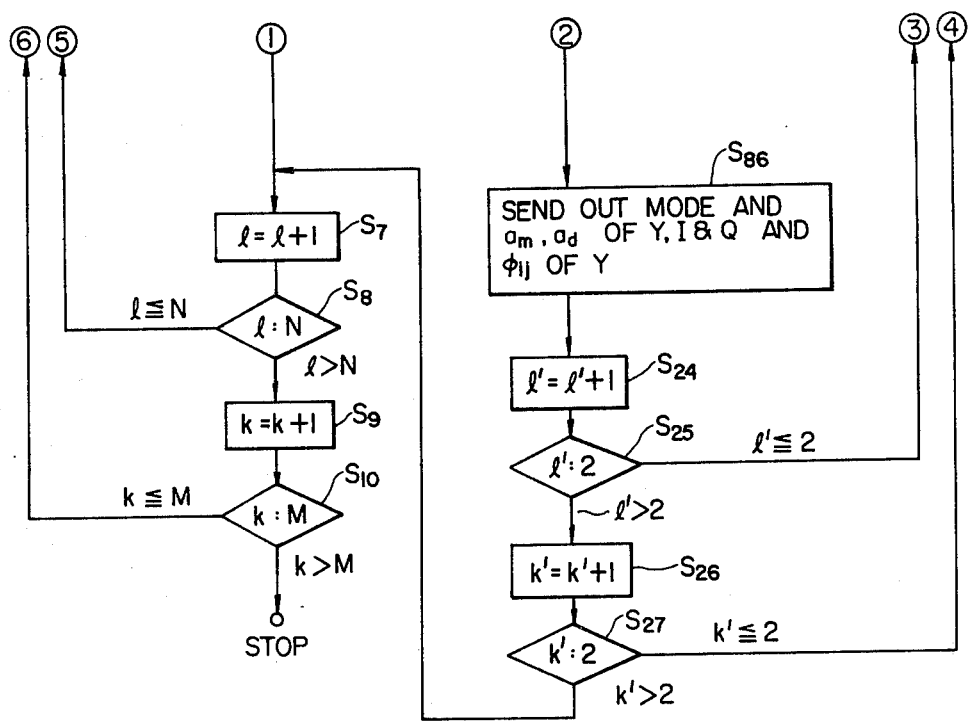
Figure 23:
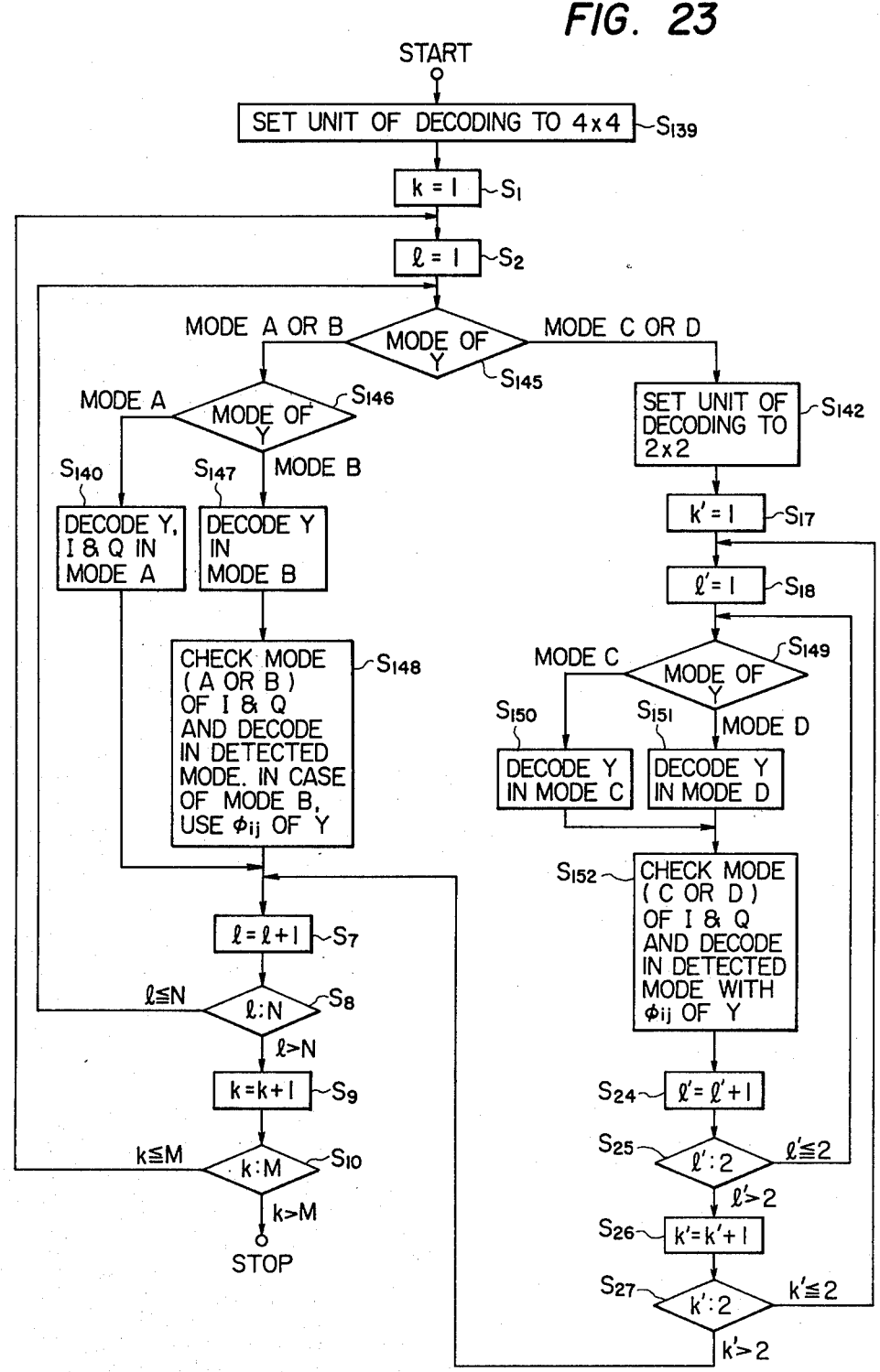
FIG. 23 is a flowchart showing an example of decoding processing for codes encoded using a resolution code of the Y color plane in common to the other color planes.

Turning next to FIG. 23, a description will be given of the decoding of the data encoded using the resolution code of the Y color plane in common to the I and Q color planes as described previously in connection with FIG. 11. In step $S_{139}$ it is set that the unit of data to be decoded is 4×4 blocks, and in steps $S_1$ and $S_2$ a decoding start block is designated. In step $S_{145}$ it is checked whether the mode information of the designated block in the Y color plane is A, B or C, D. If the mode information is decided to be A or B, then it is further checked whether the mode is A or B; in the case of mode A, the designated block of each of the Y, I and Q color planes is decoded in mode A, and then the program proceeds to step $S_7$. When the mode information is decided to be B in step $S_{146}$, the designated block of the Y color plane is decoded in mode B. Next, in step $S_{148}$ the mode of each of the I and Q color planes is checked in connection with the decoded block; in the case of mode A, they are decoded in mode A, and in the case of mode B, they are decoded in mode B. The resolution code $\phi_{ij}$ used in this decoding is one corresponding to the Y color plane. Next, the program proceeds to step $S_7$. When the mode information is decided to be C or D in step $S_{145}$, it is set that the unit of data to be decoded is 2×2 small blocks. In steps $S_{17}$ and $S_{18}$ a decoding start block of the small blocks is designated. In step $S_{149}$ the mode information of the Y color plane is checked in connection with the designated small block. If the mode information is decided to be C, the Y color plane is decoded in mode C in respect of the designated small block in step $S_{150}$, and the program proceeds to step $S_{152}$. In the case of the mode information being decided to be D in step $S_{149}$, the Y color plane is decoded in mode D in connection with the designated small block in step $S_{149}$, and then the program proceeds to step $S_{152}$. In step $S_{152}$ the mode of the designated small block of each of the I and Q color planes is checked, and in dependence on whether the mode is C or D, the designated small blocks of the I and Q color planes are decoded using the resolution code of the corresponding small block of the Y color plane. Next, the program proceeds to step $S_{24}$, and by steps $S_{25}$ to $S_{27}$, the four small blocks are designated one after another, and for each designated small block, the mode of the Y color plane is decided and the designated small block of the Y color plane is decoded, and furthermore, the small blocks of the I and Q color planes corresponding to the designated small block of the Y color plane are decoded using the resolution code of the Y color plane. Upon completion of decoding of the four small blocks in step $S_{27}$, the program proceeds to step $S_7$. In steps $S_7$ to $S_{10}$, 4×4 blocks are designated one after another, and upon each designation of the block, the designated block of the Y color plane is decoded, and then the blocks of the I and Q color planes corresponding to the designated block of the Y color plane are decoded using its resolution code.

Figure 24:
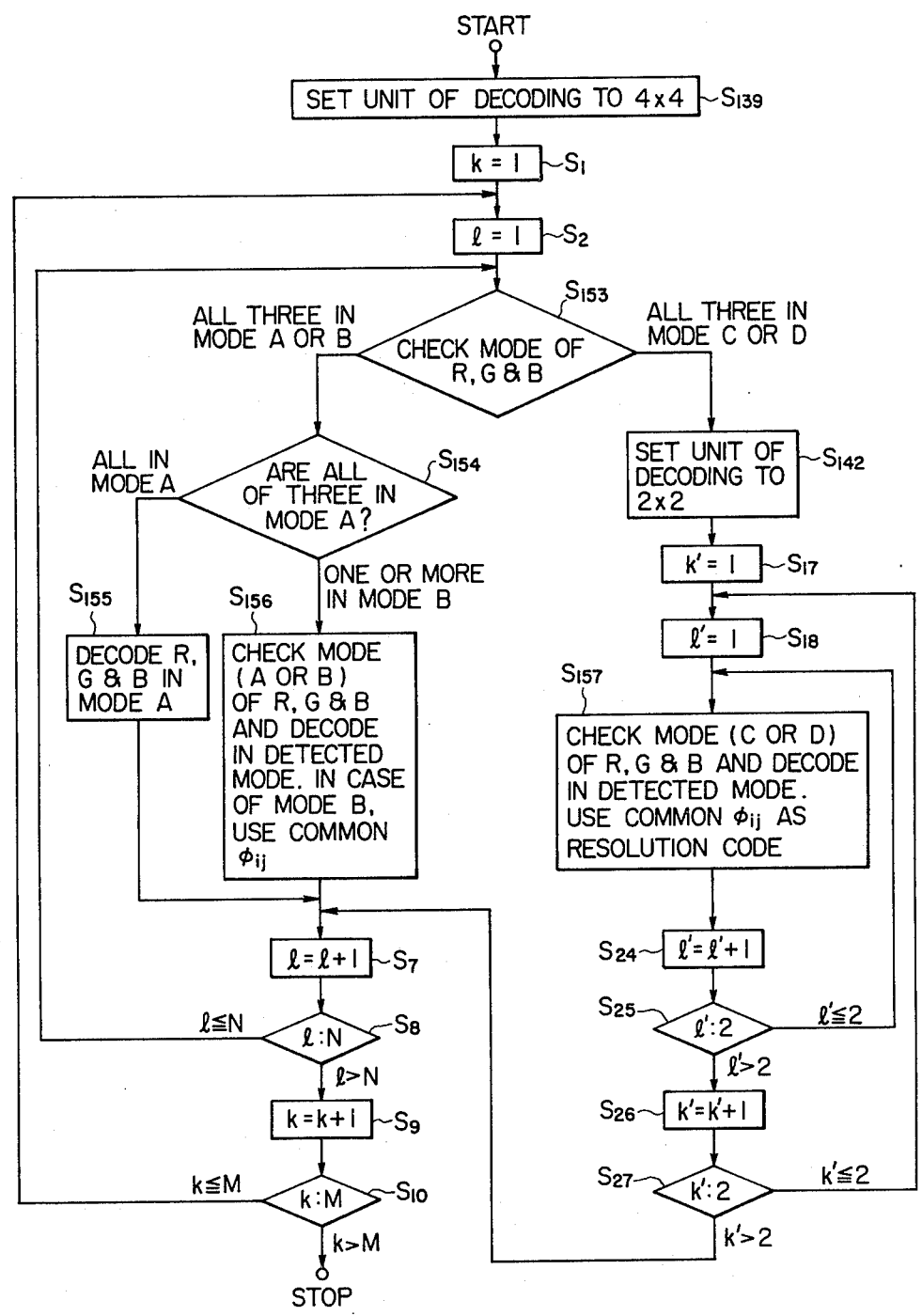
FIG. 24 is a flowchart showng an example of decoding processing for codes encoded using a common resolution code in common to R, G and B color planes.

Next, a description will be given, with reference to FIG. 24, of the decoding of data encoded using a resolution code in common to the R, G and B color planes. In this case, the decode processing takes place while checking the mode information of the respective color planes in parallel. In step $S_{139}$ the unit of data to be decoded is set to 4×4 blocks, and in steps $S_1$ and $S_2$ a decoding start block is designated. In step $S_{153}$ it is checked whether the mode information of the designated block is A or B, or C or D for all of the three color planes. If the mode information is decided to be A or B, the program proceeds to step $S_{154}$ in which it is checked whether the mode information of the block includes mode A or B for all of the three color planes. When the mode information is decided to have mode A for all of the three color planes, the color planes are decoded in mode A in connection with the designated block in step $S_{155}$, and then the program proceeds to step $S_7$. In the case where it is decided in step $S_{154}$ that the mode information being decided to include at least one mode B, it is checked in step $S_{156}$ whether the mode information of each color plane concerning the designated block is A or B, and the block is decoded in the mode thus decided. When two or more of the blocks are in mode B, the color planes are decoded using the resolution code $\phi_{ij}$ in common to them, and the program proceeds to step $S_7$. In the case where the mode information for the designated blocks of the three color plane is C or D in step $S_{153}$, the unit of data to be decoded is set to 2×2 blocks in step $S_{142}$ and in steps $S_{17}$ and $S_{18}$ a decoding start block in the divided block is designated. In step $S_{157}$ it is checked whether the mode of each color plane for the designated one of the divided blocks is C or D, and the block is decoded in the mode thus decided. In this case, the resolution code is used in common to all of the three color planes. Then, the program proceeds to step $S_{24}$. In steps $S_{24}$ to $S_{27}$ the blocks to be decoded are designated one after another, and decoding is carried out for each divided block. Upon completion of the decoding of the four divided blocks, the program proceeds from step $S_{27}$ to step $S_7$. In steps $S_7$ to $S_{10}$ the 4×4 blocks to be decoded are desigated successively, and upon each designation, the mode information is checked in step $S_{153}$ and each block is decoded in accordance with each mode.

As has been described in the foregoing, according to this invention, a color picture is separated into three color component pictures, and each of them is subjected to block coding; in this case, each block is encoded into gray level codes and a resolution code, and if necessary, the resolution codes of some blocks are omitted, so that the blocking coding can be accomplished by relatively simple processing. The amount of coded data can be reduced by changing the block size of each color component picture adaptively according to the property of the color component and the local characteristic of the picture. Further, the amount of coded data can be decreased by using gray level codes such as $a_m$, $a_d$ or $a_d$, $d_m$ through utilization of the correlation in gray level between adjacent pels in the block or between adjacent blocks. Moreover, it is possible to reduce the amount of coded data and the amount of processing steps by using block size switching information, mode information or the resolution code in common to the three color component pictures through effective utilization of the correlation between the color planes.

In the embodiment shown in FIG. 14, the amount of coded data is 2 bits/pel; and assuming that the amount of processing steps in this embodiment is 1 both in coding and in decoding, the amount of coded data in the conventional predictive coding is 3 to 4 bits/pel and the amount of processing steps is 0.5 in coding and 1 in decoding. According to the conventional orthogonal transformation coding, the amount of coded data is 2 bits/pel and the amount of processing steps is 5 in coding and 10 in decoding. The amount of processing steps mentioned above are calculations necessary for coding and decoding; represented in the unit of additive calculations, which are normalized by the amount of processing steps in this embodiment. It will be appreciated from the above that the equipment of this invention decreases the amount of coded data, as compared with the prior art, and markedly reduces the amount of processing steps especially in decoding. In either of coding and decoding, a microcomputer need not always be used but may also be substituted with a circuit arrangement having functions necessary for the processing. In the case of coding the color plane while changing the block size adaptively according to a coding error, the block size may be changed not only in decreasing order of size as described previously but also in increasing order of size. The adaptive codes shown in FIG. 7 can equally be applied to each color plane and a monochromatic picture.

It will be apparent that many modifications and variations may be effected without departing from the scope of the novel concepts of this invention.

What is claimed is:

1. A picture coding and/or decoding equipment comprising:
    color picture separating means for separating a color picture into three kinds of color component pictures;
    first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; said first block coding means comprising means for deciding whether or not a change in the gray level of pels in each block is below a predetermined value; means for encoding the block so that it has one typical gray level code alone or a plurality of gray level codes and a resolution code representing their distributions in the block in dependence on whether the decision result is below or above a predetermined value; and means for encoding, for each block, mode information for distinguishing between the coding with the gray level code alone and the coding including the resolution code; and
    second and third block coding means for dividing the other two color component pictures into pluralities of blocks respectively and encoding them so that each of the blocks has a gray level code representing at least one typical gray level component.

2. A picture coding and/or decoding equipment according to claim 1, wherein at least one of the second and third block coding means comprises means for deciding whether or not a change in the gray level of pels in each block is below a predetermined value; means for encoding the block so that it has one typical gray level code alone or a plurality of gray level codes and a resolution code representing their distribution in the block in dependence on whether the decision result is below or above a predetermined value; and means for encoding, for each block, mode information for distinguishing between the coding with the gray level code alone and the coding including the resolution code.

3. A picture coding and/or decoding equipment according to claim 1, wherein at least one of the second and third block coding means is means for encoding the plurality of blocks so that each of them has one typical gray level code alone.

4. A picture decoding equipment comprising:
    means for receiving control data representing code processing control information and data coded for each of blocks into which each of color component pictures is divided;
    means for deciding the content of the control data;
    means for decoding, from the decision result, the coded data of each of corresponding blocks of the color component pictures; and
    means for combining decoded outputs of the color component pictures into a composite color picture signal;
    the control data including mode information, the decoding equipment including means for decoding all pels of the block at the same gray level corresponding to the coded data used as an average gray level code according to the decision result of the mode information, and means for decoding each pel of the block using the coded data as a plurality of gray level codes and a resolution code representing their distribution in the block according to the decision result of the mode information so that the pel is given a gray level representing one of the gray level codes in accordance with the resolution code.

5. A picture decoding equipment according to claim 4, wherein the control data is a block size switching code representing the size of the block to be decoded, and wherein the unit of the blocks to be decoded is changed in accordance with the block size switching code in the course of processing for decoding one color picture plane.

6. A picture coding and/or decoding equipment comprising:

means for blocking a picture into a plurality of blocks, deciding whether the gray level of each pel of each block is larger or smaller than a threshold and obtaining an average value $a_o$ of the gray levels smaller than the threshold and an average value $a_l$ of the gray levels larger than the threshold;

means for obtaining a resolution code as information representing which one of the average values $a_o$ and $a_l$ the gray level of each pel is close to;

means for obtaining $a_m$ equal to one-half of the sum of the average values $a_o$ and $a_l$ and $a_d$ equal to one-half of the difference between the average values $a_o$ and $a_l$; and means for sending out, for each block, gray level codes respectively representing the $a_m$ and $a_d$ and the resolution code.

7. A picture coding and/or decoding equipment according to claim 6, which further comprises means for obtaining a difference $d_m$ between the $a_m$ and $a_m$ of the immediately preceding block in the course of encode processing as the gray level codes and the $a_d$ as a gray level code.

8. A picture coding and/or decoding equipment according to claim 6 or 7, which further comprises means for detecting that a change in the gray level of each pel of the block is smaller than a predetermined value, means for obtaining an average value $a_v$ of the gray levels of all pels of the block, and means for sending out only the gray level code $a_v$ for the block when the change in the gray level is smaller than the predetermined value.

9. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; and second and third block coding means for dividing the other two color component pictures into pluralities of blocks respectively and encoding them so that each of the blocks has a gray level code representing at least one typical gray level component, at least one of the second and third block coding means being means for encoding the plurality of blocks so that each of them has one typical gray level code alone.

10. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block;

the first block coding means comprising means for encoding the plurality of blocks so that each of them has a plurality of typical gray level codes and a resolution code representing their distribution in the block; means for decoding respective pels of the block from the typical gray level codes and the resolution code; error calculating means for calculating from the decoded pels and their original pels an error accompanying the coding of the block; means for comparing the calculated error with a preset value to change the size of the block in accordance with the compared output; means for outputting the typical gray level codes and the resolution code when the calculated error is within a predetermined range; and means for encoding block size switching information when changing the block size;

the first block coding means further comprising means for deciding, when the calculated error is within the predetermined range, whether a change in the gray level of pels in the block is below or above a predetermined value, by the typical gray level codes, and for outputting one typical gray level code alone or a plurality of gray level codes and a resolution code for each block in dependence on whether the change in the gray level is decided to be below or above the predetermined value; and means for encoding, for each block, mode information for distinguishing between the case of sending out of the gray level code alone and the case of sending out of the plurality of gray level codes and the resolution code; and second and third coding means for dividing the other two color component pictures into pluralities of blocks respectively and encoding them so that each of the blocks has a gray level code representing at least one typical gray level component.

11. A picture coding and/or decoding equipment according to claim 10, wherein the first block coding means comprises means for sending out a plurality of typical gray level codes and a resolution code when the calculated error is within the predetermined range and the block has a minimum one of changeable block sizes, for deciding whether the change in the gray level of pels in the block is below or above the predetermined value, by the plurality of typical gray level codes, and for reducing, when the change in the gray level is above the predetermined value, the code lengths of the typical gray level codes to be sent out as compared with those in the case of the change in the gray level below the predetermined value; and means for encoding mode information representing the difference in the code length between the typical gray level codes to be sent out.

12. A picture coding and/or decoding equipment according to claim 11, wherein at least one of the second and third block coding means is means for encoding the block corresponding to the block encoded by the first block coding means, through utilization of mode information obtained by the first block coding means.

13. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block;

second and third block coding means for dividing the other two color component pictures into pluralities of blocks respectively and encoding them so that each of the blocks has a gray level code representing at least one typical gray level component;

at least one of the second and third block coding means comprising means for encoding the plurality of blocks so that each of them has a plurality of typical gray level codes and a resolution code representing their distribution in the block; means for decoding respective pels of the block from the typical gray level codes and the resolution code; error calculating means for calculating from the decoded pels and their original pels an error accompanying the coding of the block; block size changing means for comparing the calculated error with a preset value to change the size of the block in accordance with the compared output means for rendering into output codes the typical gray level codes and the resolution code when the calculated error is within a predetermined range; and means for encoding block size switching information when changing the block size;

at least one of the second and third block coding means further comprising means for deciding, when the calculated error is within the predetermined range, whether a change in the gray level of pels in the block is below or above a predetermined value, by the typical gray level codes, and for outputting one typical gray level code along or a plurality of gray level codes and a resolution code in dependence on whether the change in the gray level is decided to be below or above the predetermined value; and means for encoding, for each block, mode information for distinguishing between the case of sending out of the gray level code alone and the case of sending out of the plurality of gray level codes and the resolution code.

14. A picture coding and/or decoding equipment according to claim 13, wherein at least one of the second and third block coding means comprises means for sending out a plurality of typical gray level codes and a resolution code when the calculated error is within the predetermined range and the block has a minimum one of changeable block sizes, for deciding whether the change in the gray level of pels in the block is below or above the predetermined value, by the plurality of typical gray level codes, and for reducing, when the change in the gray level is above the predetermined value, the code lengths of the typical gray level codes to be sent out as compared with those in the case of the change in the gray level being below the predetermined value; and means for encoding mode information representing the difference in the code length between the typical gray level codes to be sent out.

15. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; and second and third block coding means for dividing the other two color component pictures into pluralities of blocks respectively and encoding them so that each of the blocks has a gray level code representing at least one typical gray level component;

the size of the blocks into which the one color component picture is divided by the first block coding means being selected smaller than the sizes of the blocks into which the other color component pictures are divided by the second and third block coding means.

16. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; and second and third block coding means for dividing the other two color component pictures into pluralities of blocks respectively and encoding them so that each of the blocks has a gray level code representing at least one typical gray level component, at least one of the second and third block coding means being means for determining, by the resolution code obtained in the first block coding means, the typical gray level code of the block corresponding to the block encoded by the first block coding means.

17. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block;

second and third block coding means for dividing the other two color component pictures into pluralities of blocks respectively and encoding them so that each of the blocks has a gray level code representing at least one typical gray level component, each of the second and third block coding means including means for obtaining, for each block, a resolution code representing the distribution of the typical gray level codes in the block;

means for obtaining that one of corresponding blocks of the three color component pictures which has the largest change in the gray level; and means by which each of the first, second and third block coding means outputs a resolution code for the block of the largest gray level change as a resolution code common to the corresponding blocks of the other block coding means.

18. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block;

second and third block coding means for dividing the other two color component pictures into pluralities of blocks respectively and encoding them so that each of the blocks has a gray level code representing at least one typical gray level component, each of the second and third block coding means including means for obtaining, for each block, a resolution code representing the distribution of the typical gray level codes in the block; and means for producing a common resolution code from three resolution codes of the corresponding blocks obtained by the first, second and third block coding means.

19. A picture coding and/or decoding equipment comprising: color picture separating means for separating a color picture into three kinds of color component pictures; first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; second and third coding means for dividing the other two color component pictures into pluralities of blocks respectively and encoding them so that each of the blocks has a gray level code representing at least one typical gray level component, at least one of the second and third block coding means comprising means for deciding whether or not a change in the gray level of pels in each block is below a predetermined value; means for encoding the block so that it has one typical gray level code alone or a plurality of gray level codes and a resolution code representing their distribution in the block in dependence on whether the decision result is below or above a predetermined value; and means for encoding, for each block, mode information for distinguishing between the coding with the gray level code alone and the coding including the resolution code.

20. A picture coding and/or decoding equipment comprising: color picture separating means for separating a color picture into three kinds of color component pictures; first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; the first block coding means comprising means for encoding the plurality of blocks so that each of them has a plurality of typical gray level codes and a resolution code representing their distribution in the block, means for decoding respective pels of the block from the typical gray level codes and the resolution code, error calculating means for calculating from the decoded pels and their original pels an error accompanying the coding of the block, means for comparing the calculated error with a preset value to change the size of the block in accordance with the compared output, means for outputting the typical gray level codes and the resolution code when the calculated error is within a predetermined range, and means for encoding block size switching information when changing the block size; the first block coding means further comprising means for sending out a plurality of typical gray level codes and a resolution code when the calculated error is within the predetermined range and the block has a minimum one of changeable block sizes, for deciding whether the change in the gray level of pels in the block is below or above the predetermined value, by the plurality of typical gray level codes, and for reducing, when the change in the gray level is above the predetermined value, the code lengths of the typical gray level codes to be sent out as compared with those in the case of the change in the gray level being below the predetermined value, and means for encoding mode information representing the difference in the code length between the typical gray level codes to be sent out; and second and third coding means for dividing the other two color component pictures into pluralities of blocks respectively and encoding them so that each of the blocks has a gray level code representing at least one typical gray level component.

21. A picture coding and/or decoding equipment comprising:

color picture separating means for separating a color picture into three kinds of color component pictures;

first block coding means for dividing one of the three color component pictures into a plurality of blocks and encoding them so that at least one of the blocks has a gray level code representing at least one typical gray level component of the block and that at least one of the blocks has a plurality of gray level codes and a resolution code representing their distribution in the block; the first block coding means comprising means for encoding the plurality of blocks so that each of them has a plurality of typical gray level codes and a resolution code representing their distribution in the block, means for decoding respective pels of the block from the typical gray level codes and the resolution code, error calculating means for calculating from the decoded pels and their original pels an error accompanying the coding of the block, means for comparing the calculated error with a preset value to change the size of the block in accordance with the compared output, means for outputting the typical gray level codes and the resolution code when the calculated error is within a predetermined range, and means for encoding block size switching information when changing the block size; and second and third block coding means for dividng the other two color component pictures into pluralities of blocks respectively and encoding them so that each of the blocks has a gray level code representing at least one typical gray level component, at least one of the second and third block coding means being operative to divide one of the other two color component pictures into blocks and encode them in accordance with the block switching information obtained in the first block coding means.

22. A picture coding and/or decoding equipment according to one of claims 1, 2, 3, 11, 12, 14, 9, 10, 13, 15, 16, 17, 18, 19, 20 or 21, wherein the typical gray level code obtaining means of at least one of the first, second and third block coding means is means for deciding whether the gray level of each pel in the block is larger or smaller than a threshold and for outputting, as the typical gray level codes, an average value $a_o$ of the gray levels smaller than the threshold and an average value of $a_l$ of the gray levels of the pels larger than the threshold.

23. A picture coding and/or decoding equipment according to one of claims 1, 2, 3, 11, 12, 14, 9, 10, 13, 15, 16, 17, 18, 19, 20 or 21, wherein the typical gray level code obtaining means of at least one of the first, second and third block coding means is means for deciding whether the gray level of each pel in the block is larger or smaller than a threshold, for obtaining an average value $a_o$ of the gray levels smaller than the threshold and an average value of $a_l$ of the gray levels larger than the threshold, and for outputting, as the typical gray levels codes, $a_m$ equal to one-half of the sum of the average values $a_o$ and $a_l$ and $a_d$ equal to one-half of the difference between the average values $a_o$ and $a_l$.

24. A picture coding and/or decoding equipment according to claim 23, which further includes means by which, when the change in the gray level of the pels in the block is smaller than a predetermined value, an average gray level $a_v$ of the pels in the block is used as the $a_m$.

25. A picture coding and/or decoding equipment according to one of claims 1, 2, 3, 11, 12, 14, 9, 10, 13, 15, 16, 17, 18, 19, 20 or 21, wherein the typical gray level code obtaining means of any one of the first, second and third block coding means is means for deciding whether the gray level of each pel in the block is larger or smaller than a threshold, for obtaining an average value $a_o$ of the gray levels smaller than the threshold and an average value $a_l$ of the gray levels larger than the threshold, for obtaining $a_m$ equal to one-half of the sum of the average values $a_o$ and $a_l$ and $a_d$ equal to one-half of the difference between the average values $a_o$ and $a_l$, and for outputting, as the typical gray level codes, a difference $d_m$ between the $a_m$ of the immediately preceding block of the same block size and $a_m$ of the block being processed currently and $a_d$ of the latter.

26. A picture coding and/or decoding equipment according to claim 25 which further includes means by which, when the change in the gray level of the pels in the block is smaller than a predetermined value, an average gray level $a_v$ of the pels in the block is used as the $a_m$.

27. A picture coding and/or decoding equipment according to claim 1, 2 or 19, which further includes means for sending out the codes of the mode information of one picture plane and the gray level codes and the resolution code of one picture plane separately of each other.

28. A picture coding and/or decoding equipment according to claims 7, 11, 10, 13 or 20, which further includes means for sending out both of the codes of the block size switching information and the mode information of one picture plane and both of the gray level codes and the resolution codes of one picture plane separately of each other.

* * * * *